US011213789B2

(12) United States Patent
Hilgendorff et al.

(10) Patent No.: US 11,213,789 B2
(45) Date of Patent: Jan. 4, 2022

(54) INTEGRATED SCR AND AMMONIA OXIDATION CATALYST SYSTEMS

(71) Applicant: BASF Corporation, Florham Park, NJ (US)

(72) Inventors: Marcus Hilgendorff, Hannover (DE); Karifala Dumbuya, Hannover (DE); Claudia Zabel, Hannover (DE); Susanne Stiebels, Hannover (DE)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 15/757,384

(22) PCT Filed: Aug. 29, 2016

(86) PCT No.: PCT/EP2016/070292
§ 371 (c)(1),
(2) Date: Mar. 5, 2018

(87) PCT Pub. No.: WO2017/037006
PCT Pub. Date: Mar. 9, 2017

(65) Prior Publication Data
US 2019/0022584 A1   Jan. 24, 2019

(30) Foreign Application Priority Data

Sep. 4, 2015 (EP) .................................... 15183947

(51) Int. Cl.
| | | |
|---|---|---|
| *B01J 37/02* | (2006.01) | |
| *B01J 35/00* | (2006.01) | |
| *B01D 53/94* | (2006.01) | |
| *B01J 29/76* | (2006.01) | |
| *F01N 3/20* | (2006.01) | |

(52) U.S. Cl.
CPC ..... *B01D 53/9436* (2013.01); *B01D 53/9418* (2013.01); *B01D 53/9477* (2013.01); *B01J 29/763* (2013.01); *B01J 35/0006* (2013.01); *B01J 37/0244* (2013.01); *B01J 37/0246* (2013.01); *F01N 3/2066* (2013.01); *B01D 2255/1021* (2013.01); *B01D 2255/1025* (2013.01); *B01D 2255/2042* (2013.01); *B01D 2255/2063* (2013.01); *B01D 2255/2065* (2013.01); *B01D 2255/2073* (2013.01); *B01D 2255/2092* (2013.01); *B01D 2255/20707* (2013.01); *B01D 2255/20715* (2013.01); *B01D 2255/20769* (2013.01); *B01D 2255/20776* (2013.01); *B01D 2255/50* (2013.01)

(58) Field of Classification Search
None
See application file for complete search history.

(56) References Cited

U.S. PATENT DOCUMENTS

| | | | | |
|---|---|---|---|---|
| 1,927,963 | A | * | 9/1933 | Taylor ...................... B01J 23/40 502/339 |
| 3,030,181 | A | | 4/1962 | Milton |
| 3,931,051 | A | * | 1/1976 | Dubler ..................... B01J 23/64 502/314 |
| 4,329,162 | A | | 5/1982 | Pitcher, Jr. |
| 4,440,871 | A | | 4/1984 | Lok et al. |
| 4,544,538 | A | | 10/1985 | Zones |
| 6,162,415 | A | | 12/2000 | Liu et al. |
| 7,229,597 | B2 | | 6/2007 | Patchett et al. |
| 7,264,789 | B1 | | 9/2007 | Verduijn et al. |
| 2010/0027423 | A1 | | 2/2010 | Bauman et al. |
| 2010/0111796 | A1 | | 5/2010 | Caudle et al. |
| 2010/0229391 | A1 | * | 9/2010 | Bernard ..................... B41J 2/16 29/890.1 |

(Continued)

FOREIGN PATENT DOCUMENTS

| | | |
|---|---|---|
| CN | 101454065 | 6/2009 |
| CN | 102216582 | 10/2011 |

(Continued)

OTHER PUBLICATIONS

U.S. Appl. No. 15/124,146, filed Jan. 26, 2017, US2017/021338, Grubert et al.
U.S. Appl. No. 15/574,910, filed Nov. 17, 2017, Punke et al.
U.S. Appl. No. 14/107,704, filed Jun. 18, 2015, US2015/165422, Sung et al.
U.S. Appl. No. 14/107,781, filed Jun. 18, 2015, US2015/165423, Sung et al.
U.S. Appl. No. 15/555,131, filed Feb. 15, 2018, US2018/043335, Grubert et al.

(Continued)

*Primary Examiner* — Sheng H Davis
(74) *Attorney, Agent, or Firm* — Finnegan, Henderson Farabow, Garrett & Dunner LLP

(57) ABSTRACT

A catalyst containing a washcoat including copper or iron on a small pore molecular sieve material having a maximum ring size of eight tetrahedral atoms physically mixed with platinum and rhodium on a refractory metal oxide support including alumina, silica, zirconia, titania, and a physical mixture or a chemical combination or an atomically doped combination thereof is described. A catalyst containing a first washcoat zone substantially free of platinum group metal and including copper or iron on a small pore molecular sieve material having a maximum ring size of eight tetrahedral atoms; and a second washcoat zone including copper or iron on a small pore molecular sieve material having a maximum ring size of eight tetrahedral atoms physically mixed with platinum or platinum and rhodium on a refractory metal oxide support including alumina, silica, zirconia, titania, and a physical mixture or a chemical combination or an atomically doped combination thereof is provided. A method and a system for treating emissions using the catalyst are also described.

25 Claims, 5 Drawing Sheets

(56) References Cited

U.S. PATENT DOCUMENTS

| | | |
|---|---|---|
| 2011/0182791 A1 | 7/2011 | Fedeyko et al. |
| 2011/0229391 A1* | 9/2011 | Paulus ............... B01D 53/9468 423/213.2 |
| 2011/0286900 A1 | 11/2011 | Caudle et al. |
| 2012/0201731 A1 | 8/2012 | Ballinger et al. |
| 2012/0247092 A1* | 10/2012 | Boorse ............... B01D 53/9468 60/301 |
| 2013/0340414 A1* | 12/2013 | Bergeal .................. B01J 23/96 60/299 |
| 2015/0037532 A1* | 2/2015 | Shibata ................ B01D 46/247 428/117 |
| 2015/0290630 A1* | 10/2015 | Nazarpoor ........... B01J 23/8986 502/324 |

FOREIGN PATENT DOCUMENTS

| | | |
|---|---|---|
| CN | 102985655 | 3/2013 |
| EP | 2692437 * | 2/2012 |
| EP | 2654929 | 6/2012 |
| EP | 2 878 360 A1 | 6/2015 |
| GB | 868846 A | 5/1961 |
| JP | 2010-519039 A | 6/2010 |
| JP | 2012-507662 A | 3/2012 |
| WO | 2007/137675 | 12/2007 |
| WO | WO 2010/012730 A1 | 2/2010 |
| WO | WO 2010/062730 A2 | 6/2010 |
| WO | WO 2012/075400 A1 | 6/2012 |

OTHER PUBLICATIONS

U.S. Appl. No. 15/555,142, filed Feb. 15, 2018, US2018/043336, Grubert et al.
U.S. Appl. No. 15/747,240, filed Jan. 24, 2018, Hilgendorff et al.
U.S. Appl. No. 15/748,501, filed Jan. 29, 2018, Dumbuya et al.
U.S. Appl. No. 15/757,384, filed Mar. 5, 2018, Hilgendorff et al.
International Preliminary Report on Patentability and Written Opinion dated Mar. 15, 2018 in PCT/EP2016/070292, 9 pages.
Ronald M. Heck, et al., "Catalytic Air Pollution Control" Wiley-Interscience, Second Edition, 2002, pp. 18-19 and cover pages.
Donald W. Breck, "Zeolite Molecular Sieves" Wiley-Interscience by John Wiley & Sons, 1973, pp. 1-28 and cover page.

* cited by examiner

INTEGRATED SCR AND AMMONIA OXIDATION CATALYST SYSTEMS

TECHNICAL FIELD

The invention pertains to catalysts, methods of treating emissions in an exhaust stream, and systems for treating emissions produced in an exhaust gas stream.

BACKGROUND

Diesel engine exhaust is a heterogeneous mixture that contains particulate emissions such as soot and gaseous emissions such as carbon monoxide, unburned or partially burned hydrocarbons, and nitrogen oxides (collectively referred to as $NO_x$). Catalyst compositions, often disposed on one or more monolithic substrates, are placed in engine exhaust systems to convert certain or all of these exhaust components to innocuous compounds.

Ammonia selective catalytic reduction (SCR) is a $NO_x$ abatement technology that will be used to meet strict $NO_x$ emission targets in diesel and lean-burn engines. In the ammonia SCR process, $NO_x$ (normally consisting of $NO+NO_2$) is reacted with ammonia (or an ammonia precursor such as urea) to form dinitrogen ($N_2$) over a catalyst typically composed of base metals. This technology is capable of $NO_x$ conversions greater than 90% over a typical diesel driving cycle, and thus it represents one of the best approaches for achieving aggressive $NO_x$ abatement goals.

A characteristic feature of some ammonia SCR catalyst materials is a propensity to retain considerable amounts of ammonia on Lewis and Brønsted acidic sites on the catalyst surface during low temperature portions of a typical driving cycle. A subsequent increase in exhaust temperature can cause ammonia to desorb from the ammonia SCR catalyst surface and exit the exhaust pipe of the vehicle. Overdosing ammonia in order to increase $NO_x$ conversion rate is another potential scenario where ammonia may exit from the ammonia SCR catalyst.

Ammonia slip from the ammonia SCR catalyst presents a number of problems. The odor threshold for $NH_3$ is 20 ppm in air. Eye and throat irritation are noticeable above 100 ppm, skin irritation occurs above 400 ppm, and the IDLH is 500 ppm in air. $NH_3$ is caustic, especially in its aqueous form. Condensation of $NH_3$ and water in cooler regions of the exhaust line downstream of the exhaust catalysts will give a corrosive mixture.

Therefore, it is desirable to eliminate the ammonia before it can pass into the tailpipe. A selective ammonia oxidation (AMOx) catalyst is employed for this purpose, with the objective to convert the excess ammonia to $N_2$.

WO2010/062730 describes the application of an undercoat with Pt on alumina located in the outlet zone of the monolith with an overlayer of copper on chabazite distributed over the entire length of a monolithic converter.

Despite the use of selective ammonia oxidation catalysts, it would be desirable to provide a catalyst for selective ammonia oxidation that is able to convert ammonia at a wide range of temperatures where ammonia slip occurs in the vehicles driving cycle, and can produce minimal nitrogen oxide byproducts. The AMOx catalyst should also produce minimal $N_2O$, which is a potent greenhouse gas.

SUMMARY

Aspects of the invention include catalyst systems for treating an exhaust gas stream, and methods of preparing catalysts for the treatment of such gas. As used herein, the term "catalyst system" shall include two or more chemical catalytic functions on one substrate or on more than one separate substrate.

A first aspect of the invention is directed to a catalyst for oxidizing ammonia. In a first embodiment, a catalyst for oxidizing ammonia, comprises: a washcoat including copper or iron on a small pore molecular sieve material having a maximum ring size of eight tetrahedral atoms mixed with platinum and rhodium on a refractory metal oxide support including alumina, silica, zirconia, titania, and physical mixtures or chemical combinations thereof, including atomically doped combinations.

In a second embodiment, the catalyst of the first embodiment is modified, wherein the washcoat is disposed on a monolithic substrate.

In a third embodiment, the catalyst of the second embodiment is modified, wherein the monolithic substrate is a flow-through honeycomb substrate comprising a plurality of fine, substantially parallel gas flow passages extending along a longitudinal axis of the substrate.

In a fourth embodiment, the catalyst of the first through third embodiments is modified, wherein the catalyst contains an amount of platinum and an amount of rhodium.

In a fifth embodiment, the catalyst of the fourth embodiment is modified, wherein the amount of platinum is present in an amount in a range of 0.3 $g/ft^3$ to 20 $g/ft^3$ and rhodium is present in an amount in a range of 0.3 $g/ft^3$ to 20 $g/ft^3$, and wherein there is no other platinum group metal present.

In a sixth embodiment, the catalyst of the first through fifth embodiments is modified, wherein the copper or iron on a molecular sieve material and the platinum and rhodium on the refractory metal oxide support are homogenously mixed in the washcoat.

In a seventh embodiment, the catalyst of the first through fifth embodiments is modified, wherein the copper or iron on a molecular sieve material and the platinum and rhodium on the refractory metal oxide support are segregated from one another and the platinum and rhodium on the refractory metal oxide support is physically mixed with copper or iron on a molecular sieve material.

In an eighth embodiment, the catalyst of the first through seventh embodiments is modified, wherein the refractory metal oxide support is doped with a dopant selected from one or more of Ce, La, Ba, Zr, Hf, Ta, Mn, Si, Ti, W, Mo, and Re.

In a ninth embodiment, the catalyst of the first through eighth embodiments is modified, wherein the washcoat is substantially free of copper aluminate.

In a tenth embodiment, the catalyst of the first through ninth embodiments is modified, wherein the molecular sieve material is selected from framework types CHA, AEI, AFX, ERI, KFI, LEV, AFT, EAB, DDR, PAU, RHO, SAV, SAT, TSC, UEI and combinations thereof.

In an eleventh embodiment, the catalyst of the first through tenth embodiments is modified, wherein the molecular sieve material has the CHA framework type.

In a twelfth embodiment, the catalyst of the first through ninth embodiments is modified, wherein the molecular sieve material has a silica to alumina ratio in a range of 2 to 200.

In a thirteenth embodiment, the catalyst of the first through twelfth embodiments is modified, wherein the washcoat includes copper on a small pore molecular sieve material having a maximum ring size of eight tetrahedral atoms.

In a fourteenth embodiment, the catalyst of the first through twelfth embodiments is modified, wherein the washcoat includes iron on a small pore molecular sieve material having a maximum ring size of eight tetrahedral atoms.

A second aspect of the present invention is directed to a catalyst for oxidizing ammonia. In a fifteenth embodiment, a catalyst for oxidizing ammonia comprises: a first washcoat zone including copper or iron on a small pore molecular sieve material having a maximum ring size of eight tetrahedral atoms, the first washcoat zone being substantially free of platinum group metal; and a second washcoat zone including copper or iron on a small pore molecular sieve material having a maximum ring size of eight tetrahedral atoms physically mixed with platinum on a refractory metal oxide support including alumina, silica, zirconia, titania, and physical mixtures or chemical combinations thereof, including atomically doped combinations.

In a sixteenth embodiment, the catalyst of the fifteenth embodiment is modified, wherein the first washcoat zone and second washcoat zone are disposed on a monolithic substrate.

In a seventeenth embodiment, the catalyst of the sixteenth embodiment is modified, wherein the first washcoat zone and the second washcoat zone are disposed adjacent on the monolithic substrate, and the first washcoat zone is upstream from the second washcoat zone.

In an eighteenth embodiment, the catalyst of the fifteenth through seventeenth embodiments is modified, wherein the second washcoat zone contains platinum and no other platinum group metal.

In a nineteenth embodiment, the catalyst of the fifteenth through seventeenth embodiments is modified, wherein the second washcoat zone contains further comprise rhodium, and no other platinum group metal.

In a twentieth embodiment, the catalyst of the fifteenth through nineteenth embodiments is modified, wherein the molecular sieve material is selected from framework types CHA, AEI, AFX, ERI, KFI, LEV, AFT, EAB, DDR, PAU, RHO, SAV, SAT, TSC, UEI and combinations thereof.

In a twenty-first embodiment, the catalyst of the fifteenth through twentieth embodiments is modified, wherein the molecular sieve material has the CHA framework type.

In a twenty-second embodiment, the catalyst of the fifteenth through twenty-first embodiments is modified, wherein the molecular sieve material has a silica to alumina ratio in a range of 2 to 200.

A third aspect of the present invention is directed to a method for treating emissions. In a twenty-third embodiment, a method for treating emissions produced in an exhaust gas stream of a lean-burn engine, comprises: injecting ammonia or an ammonia precursor into an exhaust gas stream containing one or more of $NO_x$, CO, or hydrocarbons; and passing the exhaust gas stream through the catalyst of any of the first through twenty-second embodiments.

A fourth aspect of the present invention is directed to a system for treating emissions. In a twenty-fourth embodiment, a system for treating emissions produced in an exhaust gas stream of a lean-burn engine, comprises: a source of ammonia and an injector to inject the source of ammonia into the exhaust gas stream; a selective catalytic reduction catalyst downstream from the source of ammonia to promote reaction of the ammonia with nitrogen oxides to form nitrogen and $H_2O$ selectively; and the catalyst according to any of the first through twenty-second embodiments.

In a twenty-fifth embodiment, the system of twenty-fourth embodiment is modified wherein the system further comprises an ammonia oxidation (AMOx) catalyst.

BRIEF DESCRIPTION OF THE DRAWINGS

The following drawings illustrate embodiments of the invention. It is to be understood that the Figures are not intended to be to scale and that certain features such as monolith channels may be increased in size to show features according to embodiments of the invention.

DETAILED DESCRIPTION

Figure 1:
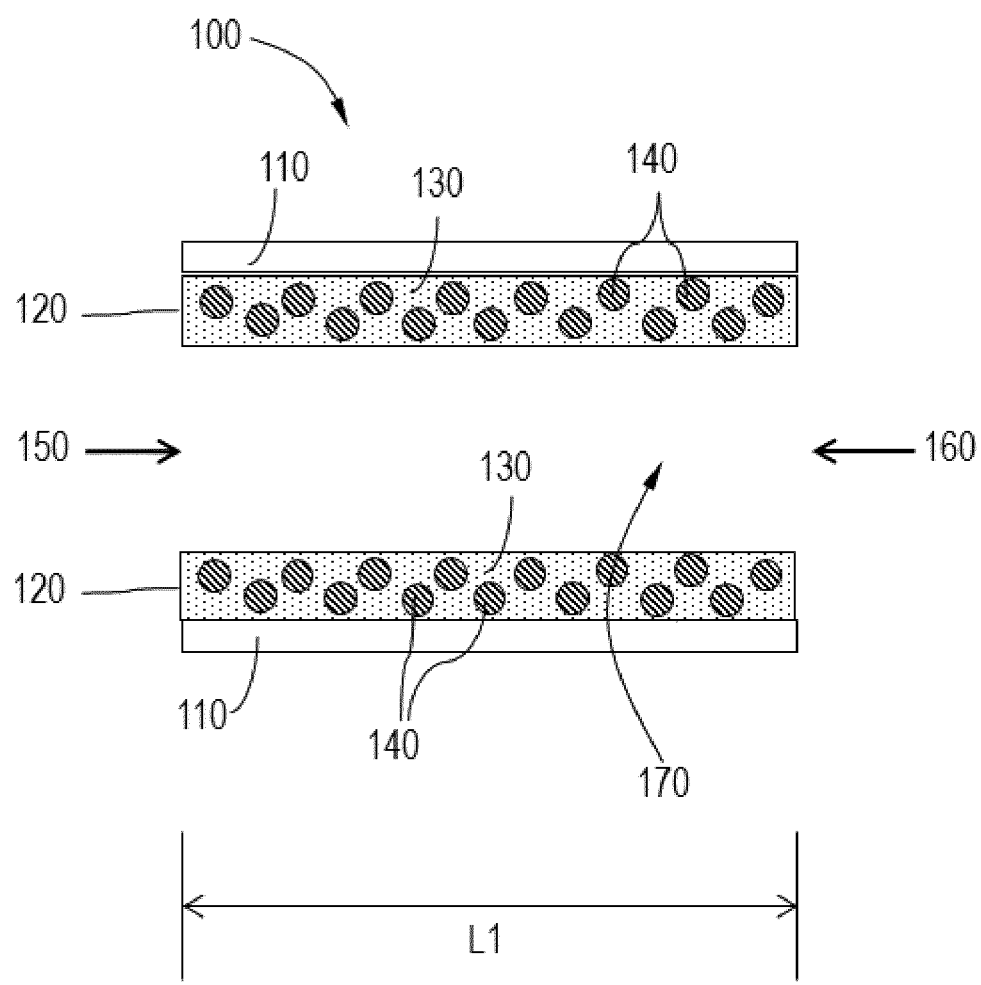
FIG. 1 shows a partial cross-sectional view of catalyst according to one or more embodiments.

Before describing several exemplary embodiments of the invention, it is to be understood that the invention is not limited to the details of construction or process steps set forth in the following description. The invention is capable of other embodiments and of being practiced or being carried out in various ways.

Embodiments of the invention are directed to catalysts for oxidizing ammonia. A first aspect of the invention is directed to a catalyst comprising a washcoat including copper or iron on a small pore molecular sieve material having a maximum ring size of eight tetrahedral atoms mixed with platinum and rhodium on a refractory metal oxide support. A second aspect of the invention is directed to a catalyst comprising a first washcoat zone including copper or iron on a small pore molecular sieve material having a maximum ring size of eight tetrahedral atoms and a second washcoat zone including copper or iron on a small pore molecular sieve material having a maximum ring size of eight tetrahedral atoms mixed with platinum on a refractory metal oxide support.

It was surprisingly found that the catalysts are particularly suitable in exhaust gas purification catalyst components, in particular as ammonia oxidation catalysts that provide good $NO_x$ conversion with low $N_2O$ and $NH_3$ emissions. It is desirable to avoid $NH_3$ emissions during temperature increases that are accompanied by a strong reduction of ammonia adsorption capacity (i.e. from approximately 200° C. to 300 and 400° C.).

With respect to the terms used in this disclosure, the following definitions are provided.

As used in this specification and the appended claims, the singular forms "a," "an," and "the" include plural referents unless the context clearly indicates otherwise. Thus, for example, reference to "a catalyst" includes a mixture of two or more catalysts, and the like.

As used herein, the term "abate" means to decrease in amount and "abatement" means a decrease in the amount, caused by any means. Where they appear herein, the terms "exhaust stream" and "engine exhaust stream" refer to the engine out effluent as well as to the effluent downstream of one or more other catalyst system components including but not limited to a diesel oxidation catalyst and/or soot filter.

An aspect of the invention pertains to a catalyst. According to one or more embodiments, the catalyst may be disposed on a monolithic substrate as a washcoat layer. As used herein and as described in Heck, Ronald and Robert Farrauto, Catalytic Air Pollution Control, New York: Wiley-Interscience, 2002, pp. 18-19, a washcoat layer comprises a compositionally distinct layer of material disposed on the surface of the monolithic substrate or an underlying washcoat layer. A washcoat typically is comprised of a high surface area carrier, for example aluminum oxide, and catalytic components such as a platinum group metal. A catalyst can contain one or more washcoat layers, and each washcoat layer can have unique chemical catalytic functions. As used herein, the term "catalyst" or "catalyst composition" or "catalyst material" refers to a material that promotes a reaction.

As used herein, the term "catalytic article" refers to an element that is used to promote a desired reaction. For example, a catalytic article may comprise a washcoat containing a catalytic species, e.g. a catalyst composition, on a substrate.

As used herein, the term "selective catalytic reduction" (SCR) refers to the catalytic process of reducing oxides of nitrogen to dinitrogen ($N_2$) using a nitrogenous reductant.

The selective reduction process is referred to as a SCR process (Selective Catalytic Reduction). The SCR process uses catalytic reduction of nitrogen oxides with ammonia in the presence of atmospheric oxygen with the formation predominantly of nitrogen and steam:

$4NO+4NH_3+O_2 \rightarrow 4N_2+6H_2O$ (standard SCR reaction)

$2NO_2+4NH_3 \rightarrow 3N_2+6H_2O$ (slow SCR reaction)

$NO+NO_2+NH_3 \rightarrow 2N_2+3H_2O$ (fast SCR reaction)

Catalysts employed in the SCR process ideally should be able to retain good catalytic activity over the wide range of temperature conditions of use, for example, 200° C. to 600° C. or higher, under hydrothermal conditions. Hydrothermal conditions are often encountered in practice, such as during the regeneration of a soot filter, a component of the exhaust gas treatment system used for the removal of particles.

The terms "$NH_3$ oxidation reaction" or "ammonia oxidation reaction" are used herein to refer to a chemical process described by:

$4NH_3+5O_2 \rightarrow 4NO+6H_2O$ ($NH_3$ oxidation reaction)

More generally, term "$NH_3$ oxidation reaction" refers to a process in which ammonia ($NH_3$) is reacted with oxygen ($O_2$) to produce NO, $NO_2$, $N_2O$, or preferably $N_2$. The term "$NH_3$ oxidation composition" refers to a material composition effective to catalyze the $NH_3$ oxidation reaction.

SCR Composition

In accordance with one or more embodiments of the invention, a component effective to catalyze the SCR function (herein referred to as an "SCR component") is utilized in a washcoat as part of a $NO_x$ abatement catalyst composition. Typically, the SCR component is part of a composition that includes other components in a washcoat. However, in one or more embodiments the $NO_x$ abatement catalyst composition may include only the SCR component.

As used herein, the phrase "molecular sieve" refers to framework materials such as zeolites and other framework materials (e.g. isomorphously substituted materials), which may in particulate form in combination with one or more promoter metals be used as catalysts. Molecular sieves are materials based on an extensive three-dimensional network of oxygen ions containing generally tetrahedral type sites and having a substantially uniform pore distribution, with the average pore size being no larger than 20 Å. The pore sizes are defined by the ring size. As used herein, the term "zeolite" refers to a specific example of a molecular sieve, including silicon and aluminum atoms. According to one or more embodiments, it will be appreciated that by defining the molecular sieves by their framework type, it is intended to include the framework type and any and all isotypic framework materials such as SAPO, ALPO and MeAPO materials having the same framework type as the zeolite materials.

In more specific embodiments, reference to an aluminosilicate zeolite framework type limits the material to molecular sieves that do not include phosphorus or other metals substituted in the framework. However, to be clear, as used herein, "aluminosilicate zeolite" excludes aluminophosphate materials such as SAPO, ALPO, and MeAPO materials, and the broader term "zeolite" is intended to include aluminosilicates and aluminophosphates. Zeolites are crystalline materials having rather uniform pore sizes which, depending upon the type of zeolite and the type and amount of cations included in the zeolite lattice, range from about 3 to 10 Angstroms in diameter. Zeolites generally comprise silica to alumina (SAR) molar ratios of 2 or greater.

The term "aluminophosphates" refers to another specific example of a molecular sieve, including aluminum and phosphate atoms. Aluminophosphates are crystalline materials having rather uniform pore sizes.

Generally, molecular sieves, e.g. zeolite, are defined as aluminosilicates with open 3-dimensional framework structures composed of corner-sharing $TO_4$ tetrahedra, where T is Al or Si, or optionally P. Cations that balance the charge of the anionic framework are loosely associated with the framework oxygens, and the remaining pore volume is filled with water molecules. The non-framework cations are generally exchangeable, and the water molecules removable.

In one or more embodiments, the molecular sieve materials, independently, comprise $SiO_4$/$AlO_4$ tetrahedra and are linked by common oxygen atoms to form a three-dimensional network. In other embodiments, the molecular sieve materials comprise $SiO_4$/$AlO_4$/$PO_4$ tetrahedra. The molecular sieve materials of one or more embodiments can be differentiated mainly according to the geometry of the voids which are formed by the rigid network of the ($SiO_4$)/$AlO_4$, or $SiO_4$/$AlO_4$/$PO_4$, tetrahedra. The entrances to the voids are formed from 6, 8, 10, or 12 ring atoms with respect to the atoms which form the entrance opening. In one or more embodiments, the molecular sieve materials comprise ring sizes of no larger than 12, including 6, 8, 10, and 12.

In one or more embodiments, the molecular sieve materials comprise an 8-ring small pore aluminosilicate zeolite. As used herein, the term "small pore" refers to pore openings, which are smaller than about 5 Angstroms, for example on the order of ~3.8 Angstroms. The phrase "8-ring" zeolites refers to zeolites having 8-ring pore openings and double-six ring secondary building units and having a cage like structure resulting from the connection of double six-ring building units by 4 rings. In one or more embodiments, the molecular sieve material is a small pore molecular sieve having a maximum ring size of eight tetrahedral atoms.

Zeolites are comprised of secondary building units (SBU) and composite building units (CBU), and appear in many different framework structures. Secondary building units contain up to 16 tetrahedral atoms and are non-chiral. Composite building units are not required to be achiral, and cannot necessarily be used to build the entire framework. For example, a group of zeolites have a single 4-ring (s4r) composite building unit in their framework structure. In the 4-ring, the "4" denotes the positions of tetrahedral silicon and aluminum atoms, and the oxygen atoms are located in between tetrahedral atoms. Other composite building units include, for example, a single 6-ring (s6r) unit, a double 4-ring (d4r) unit, and a double 6-ring (d6r) unit. The d4r unit is created by joining two s4r units. The d6r unit is created by joining two s6r units. In a d6r unit, there are twelve tetrahedral atoms. Zeolitic framework types that have a d6r secondary building unit include AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, and WEN.

In one or more embodiments, the molecular sieve materials comprise a d6r unit. Thus, in one or more embodiments, the molecular sieve materials have a framework type selected from AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, WEN, and combinations thereof. In other specific embodiments, the molecular sieve materials have a framework type selected from the group consisting of CHA, AEI, AFX, ERI, KFI, LEV, AFT, EAB, DDR, PAU, RHO, SAV, SAT, TSC, UEI and combinations thereof. In still further specific embodiments, the molecular sieve materials have a framework type selected from CHA, AEI, and AFX. In one or more very specific embodiments, the molecular sieve materials have the CHA framework type.

Zeolitic CHA-framework type molecular sieves includes a naturally occurring tectosilicate mineral of a zeolite group with approximate formula: $(Ca,Na_2,K_2,Mg)Al_2Si_4O_{12} \cdot 6H_2O$ (e.g., hydrated calcium aluminum silicate). Three synthetic forms of zeolitic CHA-framework type molecular sieves are described in "Zeolite Molecular Sieves," by D. W. Breck, published in 1973 by John Wiley & Sons, which is hereby incorporated by reference. The three synthetic forms reported by Breck are Zeolite K-G, described in J. Chem. Soc., p. 2822 (1956), Barrer et al; Zeolite D, described in British Patent No. 868,846 (1961); and Zeolite R, described in U.S. Pat. No. 3,030,181, which are hereby incorporated by reference. Synthesis of another synthetic form of zeolitic CHA framework type, SSZ-13, is described in U.S. Pat. No. 4,544,538, which is hereby incorporated by reference. Synthesis of a synthetic form of a molecular sieve having the CHA framework type, silicoaluminophosphate 34 (SAPO-34), is described in U.S. Pat. Nos. 4,440,871 and 7,264,789, which are hereby incorporated by reference. A method of making yet another synthetic molecular sieve having the CHA framework type, SAPO-44, is described in U.S. Pat. No. 6,162,415, which is hereby incorporated by reference.

In one or more embodiments, the molecular sieve materials can include all aluminosilicate, borosilicate, gallosilicate, MeAPSO, and MeAPO compositions. These include, but are not limited to SSZ-13, SSZ-62, natural chabazite, zeolite K-G, Linde D, Linde R, LZ-218, LZ-235. LZ-236, ZK-14, SAPO-34, SAPO-44, SAPO-47, ZYT-6, CuSAPO-34, CuSAPO-44, and CuSAPO-47.

The ratio of silica to alumina of an aluminosilicate molecular sieve component can vary over a wide range. In one or more embodiments, the molecular sieve materials, have a silica to alumina molar ratio (SAR) in the range of 2 to 300, including 5 to 250; 5 to 200; 5 to 100; and 5 to 50. In one or more specific embodiments, the molecular sieve materials have a silica to alumina molar ratio (SAR) in the range of 2 to 200, including 10 to 200, 10 to 100, 10 to 75, 10 to 60, and 10 to 50; 15 to 100, 15 to 75, 15 to 60, and 15 to 50; 20 to 100, 20 to 75, 20 to 60, and 20 to 50.

As used herein, the term "promoted" refers to a component that is intentionally added to the molecular sieve material, as opposed to impurities inherent in the molecular sieve. Thus, a promoter is intentionally added to enhance activity of a catalyst compared to a catalyst that does not have promoter intentionally added. In order to promote the SCR of oxides of nitrogen, in one or more embodiments, suitable metal(s) is independently exchanged into the molecular sieve. According to one or more embodiments, the molecular sieve is promoted with one or more of copper (Cu), iron (Fe), cobalt (Co), nickel (Ni), lanthanum (La), cerium (Ce), manganese (Mn), vanadium (V), or silver (Ag). In specific embodiment, the molecular sieve is promoted with one or more of copper (Cu) or iron (Fe). In very specific embodiments, the molecular sieve is promoted with copper (Cu). In other specific embodiments, the molecular sieve is promoted with iron (Fe).

The promoter metal content of the catalyst, calculated as the oxide, is, in one or more embodiments, at least about 0.1 wt. %, reported on a volatile-free basis. In specific embodiments, the promoter metal content, calculated as the oxide, is in the range of 0.1 wt. % up to about 10 wt. %, including 9, 8, 7, 6, 5, 4, 3, 2, 1, 0.5, 0.25, and 0.1 wt. %, in each case based on the total weight of the calcined molecular sieve reported on a volatile free basis.

In specific embodiments, the promoter metal comprises Cu, and the Cu content, calculated as CuO is in the range of 0.1 wt. % up to about 5 wt. %, including 5, 4, 3, 2, 1, 0.5, 0.25, and 0.1 wt. %, in each case based on the total weight of the calcined molecular sieve reported on a volatile free basis. In specific embodiments, the Cu content of the molecular sieve, calculated as CuO, is in the range of about 2 to about 5 wt. %.

In other specific embodiments, the promoter metal comprises Fe, and the Fe content, calculated as $Fe_2O_3$ is in the range of 0.1 wt. % up to about 5 wt. %, including 5, 4, 3, 2, 1, 0.5, 0.25, and 0.1 wt. %, in each case based on the total weight of the calcined molecular sieve reported on a volatile free basis. In specific embodiments, the Fe content of the molecular sieve, calculated as $Fe_2O_3$, is in the range of about 2 to about 5 wt. %.

$NH_3$ Oxidation Catalyst

In accordance with one or more embodiments of the invention, a composition effective to catalyze the $NH_3$ oxidation reaction is utilized as the catalyst of one or more embodiments. The ammonia contained in an exhaust gas stream is reacted with oxygen over the $NH_3$ oxidation catalyst to form $N_2$.

As otherwise mentioned herein, the $NH_3$ oxidation catalyst may include a zeolitic or non-zeolitic molecular sieve, which may have any one of the framework structures listed in the Database of Zeolite Structures published by the International Zeolite Association (IZA). In one or more embodiments, the molecular sieve material is a small pore molecular sieve material having a maximum ring size of eight tetrahedral atoms. In one or more specific embodiments, the molecular sieve material is selected from framework types CHA, AEI, AFX, ERI, KFI, LEV, AFT, EAB, DDR, PAU, RHO, SAV, SAT, TSC, UEI and combinations thereof. In other specific embodiments, the molecular sieve material has the CHA framework type.

In one embodiment, a molecular sieve component may be physically mixed with one or more platinum group metals supported on a refractory metal oxide.

The $NH_3$ oxidation catalyst may contain a component active for the ammonia SCR function. The SCR component may include any one of the molecular sieve materials described in the preceding section. In one embodiment, the $NH_3$ oxidation component is a physical mixture of one or more platinum group metals supported on a refractory metal oxide and copper or iron on a small pore molecular sieve material having a maximum ring size of eight tetrahedral atoms. In one or more embodiments, the mixture is a homogeneous mixture. As used herein, the terms "homogeneously mixed" or "homogeneous mixture" refer to a washcoat mixture wherein a molecular sieve material and the one or more platinum group metals supported on a refractory metal oxide support are uniformly distributed throughout the washcoat such that the washcoat is the same throughout.

In one or more embodiments, the $NH_3$ oxidation component is segregated from the SCR component, not separated in a distinct layer, but physically mixed with the SCR component.

In embodiments of a first aspect of the invention, a catalyst for oxidizing ammonia comprises a washcoat including copper or iron on a small pore molecular sieve material having a maximum ring size of eight tetrahedral atoms mixed with platinum and rhodium on a refractory metal oxide support.

As used herein, the term "platinum group metal" or "PGM" refers to one or more chemical elements defined in the Periodic Table of Elements, including platinum (Pt), palladium (Pd), rhodium (Rh), osmium (Os), iridium (Ir), and ruthenium (Ru), and mixtures thereof.

As used herein, "platinum group metal component," "platinum component," "rhodium component," "palladium component, "iridium component" and the like refers the respective platinum group metal compound, complex, or the like which, upon calcination or use of the catalyst decomposes or otherwise converts to a catalytically active form, usually, the metal or the metal oxide."

In one or more embodiments of a first aspect of the invention, the platinum group metal includes platinum and rhodium. Generally, there are no specific restrictions as far as the platinum content and the rhodium content of the catalyst is concerned. In one or more embodiments the platinum loading is in the range of 0.3 $g/ft^3$ to 20 $g/ft^3$, including 2 $g/ft^3$ to 20 $g/ft^3$, 2 $g/ft^3$ to 10 $g/ft^3$, and 2 $g/ft^3$ to 5 $g/ft^3$, and the rhodium loading is in the range of 0.3 $g/ft^3$ to 20 $g/ft^3$, including 2 $g/ft^3$ to 20 $g/ft^3$, 2 $g/ft^3$ to 10 $g/ft^3$, and 2 $g/ft^3$ to 5 $g/ft^3$. In one or more specific embodiments, the amount of platinum present in the catalyst is greater than or equal to the amount of rhodium present in the catalyst. In one or more embodiments, the ratio of Pt to Rh is equal to or greater than 1, including greater than about 1.5, greater than about 2, greater than about 5, greater than about 10, and greater than about 20.

In one or more embodiments, the catalyst of a first aspect of the invention is substantially free of other platinum group metals. As used herein, the terms "substantially free of other platinum group metals" or "no other platinum group metals" means that no platinum group metal other than platinum and rhodium have been intentionally added to the catalyst, and that there is generally less than about 1 wt. %, including less than about 0.75 wt. %, less than about 0.5 wt. %, less than about 0.25 wt. %, and less than about 0.1 wt. %, of other platinum group metals in the catalyst. In other words, the catalyst does not comprise palladium (Pd), ruthenium (Ru), osmium (Os), or iridium (Ir). In one or more embodiments, the catalyst comprises platinum and no other platinum group metal. In such embodiments, the catalyst does not contain palladium (Pd), ruthenium (Ru), osmium (Os), iridium (Ir), or rhodium (Rh). In other embodiments, the catalyst comprises platinum (Pt) and rhodium (Rh) and no other platinum group metal. In such embodiments, the catalyst does not contain palladium (Pd), ruthenium (Ru), osmium (Os), or iridium (Ir). It will be appreciated by one of skill in the art, however, that during loading/coating trace amounts of other platinum group metals may migrate from one washcoat component to another, such that trace amounts of other platinum group metals can be present in the catalyst.

According to one or more embodiments, one or more platinum group metal components are deposited on a refractory metal oxide support. In specific embodiments, in a first aspect of the present invention, platinum and rhodium are deposited on a refractory metal oxide support. As used herein, the terms "refractory metal oxide support" and "support" refer to the underlying high surface area material upon which additional chemical compounds or elements are carried. The support particles have pores larger than 20 Å and a wide pore distribution. As defined herein, such metal oxide supports exclude molecular sieves, specifically, zeolites. In particular embodiments, high surface area refractory metal oxide supports can be utilized, e.g., alumina support materials, also referred to as "gamma alumina" or "activated alumina," which typically exhibit a BET surface area in excess of 60 square meters per gram ("$m^2/g$"), often up to about 200 $m^2/g$ or higher. Such activated alumina is usually a mixture of the gamma and delta phases of alumina, but may also contain substantial amounts of eta, kappa, and theta alumina phases. Refractory metal oxides other than activated alumina can be used as a support for at least some of the catalytic components in a given catalyst. For example, zirconia, alpha alumina, silica, titania, and other materials are known for such use.

One or more embodiments of the present invention include a refractory metal oxide support comprising an activated compound selected from alumina, silica, zirconia, titania, and physical mixtures or chemical combinations thereof, including atomically doped combinations. One or more embodiments of the present invention include a refractory metal oxide support comprising an activated compound selected from the group consisting of alumina, zirconia, alumina-zirconia, lanthana-alumina, lanthana-zirconia-alumina, baria-alumina, baria-lanthana-alumina, baria-lanthana-neodymia-alumina, alumina-chromia, and combinations thereof. In one or more embodiments, the refractory metal oxide support comprises one or more of alumina, ceria, zirconia, ceria-zirconia mixed oxide, titania, or silica, and the refractory metal oxide support can be doped with one or more of Ce, La, Ba, Zr, Hf, Ta, Mn, Si, Ti, W, Mo, and Re. In one or more embodiments, zirconia rich mixed phases, pure zirconia, or doped zirconia are used. Although many of these materials suffer from the disadvantage of having a considerably lower BET surface area than activated alumina, that disadvantage tends to be offset by a greater durability or performance enhancement of the resulting catalyst. As used herein, the term "BET surface area" has its usual meaning of referring to the Brunauer, Emmett, Teller method for determining surface area by $N_2$ adsorption. Pore diameter and pore volume can also be determined using BET-type $N_2$ adsorption or desorption experiments.

In one or more embodiments, the refractory metal oxide support comprises alumina that is doped/stabilized with one or more of Ce, La, Ba, Zr, Hf, Ta, Mn, Si, Ti, W, Mo, and Re. In one or more embodiments, the refractory metal oxide support comprises alumina that is doped/stabilized with one or more of zirconia, silica, and titania. In one or more specific embodiments, the refractory metal oxide support comprises alumina that is doped with zirconia.

Generally, there are no specific restrictions as far as the amount of dopant/stabilizer present in the refractory metal oxide support. In one or more embodiments, the dopant (one or more of zirconia, silica, and titania) can be present in an amount in the range of from about 5 to 30 wt. %, including about 10 to 25 wt. %, and about 15 to 20 wt. %, based on the total weight of the refractory metal oxide support.

Without intending to be bound by theory, it is thought that the presence of a neutral, such as zirconia, or acidic dopant, such as silica or tungsten, prevents the reaction of copper with alumina, avoiding the formation of copper aluminate, which can deleteriously effect the performance of the catalyst. In one or more embodiments, the washcoat is substantially free of copper aluminate. As used herein, the phrase "substantially free of copper aluminate" means that there is generally less than 2% of copper aluminate present in the washcoat. In one or more embodiments, there is less 1.9%, less than 1.8%, less than 1.7%, less than 1.6%, less than 1.5%, less than 1.4%, less than 1.3%, less than 1.2%, less than 1.1%, less than 1%, less than 0.9%, less than 08.%, less than 0.7%, less than 0.6%, less than 0.5%, less than 0.4%, less than 0.3%, less than 0.2%, and less than 0.1% of copper aluminate present in the washcoat.

Embodiments of a first aspect of the invention, where the catalyst is coated onto a substrate are illustrated in FIG. 1. Referring to FIG. 1, a layered catalytic article 100 includes a substrate 110 coated with a catalyst 120, which is a washcoat including a mixture of copper on a molecular sieve material 130 and platinum and rhodium on a refractory metal oxide support 140. The substrate 110 has an inlet end 150 and an outlet end 160 defining an axial length L1. In one or more embodiments, the substrate 110 generally comprises a plurality of channels 170 of a honeycomb substrate, of which only one channel is show in cross-section for clarity. As will be appreciated by one of skill in the art, the length of the catalyst 120 on the substrate 110 can be varied, such that the catalyst 120 covers the entire substrate 110 or covers only a portion of the substrate 110.

Embodiments of a second aspect of the present invention are directed to a catalyst for oxidizing ammonia, the catalyst comprising a first washcoat zone and a second washcoat zone. In one or more embodiments, the first washcoat zone includes copper or iron on a small pore molecular sieve material having a maximum ring size of eight tetrahedral atoms, the first washcoat zone being substantially free of platinum group metal; and the second washcoat zone includes copper or iron on a small pore molecular sieve material having a maximum ring size of eight tetrahedral atoms mixed with platinum on a refractory metal oxide support.

As described above, in the second washcoat zone, the $NH_3$ oxidation component may be a physical mixture of one or more platinum group metals supported on a refractory metal oxide and copper or iron on a small pore molecular sieve material having a maximum ring size of eight tetrahedral atoms. In one or more embodiments, the mixture is a homogeneous mixture.

As used herein, the term "substantially free of platinum group metals" means that there is no platinum group metal intentionally added to the first washcoat zone, and that there is generally less than about 1 wt. %, including less than about 0.75 wt. %, less than about 0.5 wt. %, less than about 0.25 wt. %, and less than about 0.1 wt. %, of platinum group metal in the first washcoat zone. It will be appreciated by one of skill in the art, however, that during loading/coating trace amounts of platinum group metals may migrate from one washcoat zone component to another, such that trace amounts of platinum group metals can be present in the first washcoat zone.

In one or more embodiments, the first washcoat zone and the second washcoat zone are arranged in an axially zoned configuration. As used herein, the term "axially zoned" refers to the location of the first washcoat zone and the second washcoat relative to one another. Axially means side-by-side such that the first washcoat zone and the second washcoat zone are located one beside the other. In one or more embodiments, first washcoat zone and second washcoat zone are disposed on a monolithic substrate. In one or more embodiments, the first washcoat zone and the second washcoat zone are disposed on the same, or a common, substrate. In other embodiments the first washcoat zone and the second washcoat zone are disposed on separate substrates.

In one or more embodiments, the first washcoat zone is upstream from the second washcoat zone. As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine.

In one or more embodiments, the second washcoat zone includes platinum and no other platinum group metal. Generally, there are no specific restrictions as far as the platinum content of the second washcoat zone is concerned. In one or more embodiments the platinum loading is in the range of 0.3 $g/ft^3$ to 20 $g/ft^3$, including 2 $g/ft^3$ to 20 $g/ft^3$, 2 $g/ft^3$ to 10 $g/ft^3$ and 2 $g/ft^3$ to 5 $g/ft^3$. In other embodiments, the second washcoat zone includes platinum and further includes rhodium and no other platinum group metal. Generally, there are no specific restrictions as far as the platinum content and the rhodium content of the second washcoat zone is concerned. In one or more embodiments the platinum loading is in the range of 0.3 $g/ft^3$ to 20 $g/ft^3$, including 2 $g/ft^3$ to 20 $g/ft^3$, 2 $g/ft^3$ to 10 $g/ft^3$, and 2 $g/ft^3$ to 5 $g/ft^3$, and the rhodium loading is in the range of 0.3 $g/ft^3$ to 20 $g/ft^3$, including 2 $g/ft^3$ to 10 $g/ft^3$, 2 $g/ft^3$ to 10 $g/ft^3$, and 2 $g/ft^3$ to 5 $g/ft^3$. In one or more specific embodiments, the amount of platinum present in the catalyst is greater than or equal to the amount of rhodium present in the catalyst. In one or more embodiments, the ratio of Pt to Rh is equal to or greater than 1, including greater than about 1.5, greater than about 2, greater than about 5, greater than about 10, and greater than about 20.

In one or more embodiments, the molecular sieve material of the first washcoat zone and/or the second washcoat zone is a small pore molecular sieve material having a maximum ring size of eight tetrahedral atoms. In one or more specific embodiments, the molecular sieve material of the first washcoat zone and/or the second washcoat zone is selected from framework types CHA, AEI, AFX, ERI, KFI, LEV, AFT, EAB, DDR, PAU, RHO, SAV, SAT, TSC, UEI and combinations thereof. In other specific embodiments, the molecular sieve material of the first washcoat zone and/or the second washcoat zone has the CHA framework type.

In one or more embodiments, the refractory metal oxide support of the second washcoat zone may include any one of the refractory metal oxide supports described above. In one or more specific embodiments, the refractory metal oxide support of the second washcoat zone includes alumina, silica, zirconia, titania, and physical mixtures or chemical combinations thereof, including atomically doped combinations.

Figure 2A:
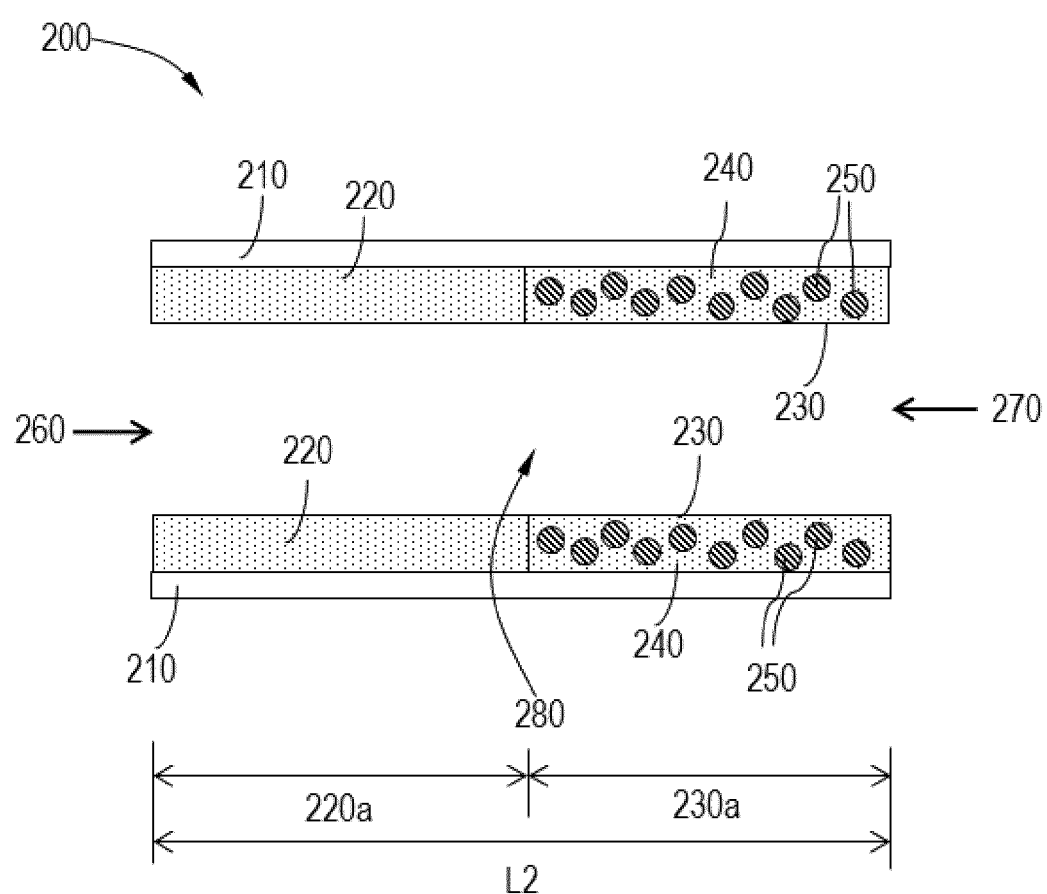
FIG. 2A shows a partial cross-sectional view of catalyst according to one or more embodiments.
Figure 2B:
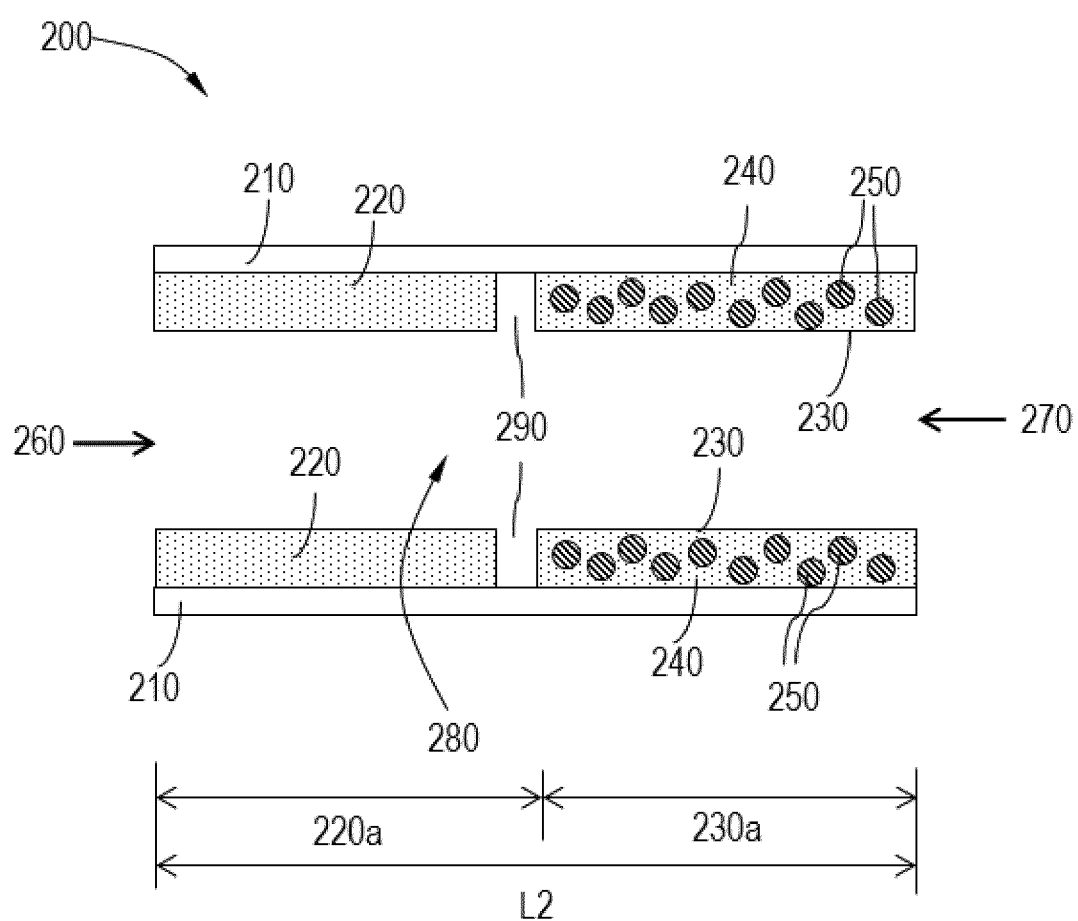
FIG. 2B shows a partial cross-sectional view of catalyst according to one or more embodiments.

Embodiments of a second aspect of the invention, where the catalyst is coated onto a substrate are illustrated in FIGS. 2A and 2B. Referring to FIG. 2A, an exemplary embodiment of an axially zoned catalytic article is shown. The catalytic article 200 is shown in an axially zoned arrangement where a first washcoat zone 220 is located upstream of a second washcoat zone 230 on a substrate 210. The first washcoat zone 220 includes copper or iron on a molecular sieve. The second washcoat zone 230 includes a mixture of copper or iron on a molecular sieve material 240 and platinum and rhodium on a refractory metal oxide support 250. The substrate 210 has an inlet end 260 and an outlet end 270 defining an axial length L2. In one or more embodiments, the substrate 210 generally comprises a plurality of channels 280 of a honeycomb substrate, of which only one channel is show in cross-section for clarity. The first washcoat zone 220 extends from the inlet end 260 of the substrate 210 through less than the entire axial length L2 of the substrate 210. The length of the first washcoat zone 220 is denoted as first washcoat zone length 2230a in FIG. 2. The second washcoat zone 230 extends from the outlet end 270 of the substrate 210 through less than the entire axial length L2 of the substrate L2. The length of the second washcoat zone 230 is denoted as second washcoat zone length 230a in FIGS. 2A and 2B.

In one or more embodiments, as illustrated in FIG. 2A, the first washcoat zone 220 including copper or iron on a molecular sieve is directly abutting the second washcoat zone 230 including a mixture of copper or iron on a molecular sieve material 240 and platinum and rhodium on a refractory metal oxide support 250. In other embodiments, as illustrated in FIG. 2B, the first washcoat zone 220 including copper or iron on a molecular sieve and the second washcoat zone 230 including a mixture of copper or iron on a molecular sieve material 240 and platinum and rhodium on a refractory metal oxide support 250 may be separated by a gap 290.

Referring to FIGS. 2A and 2B, it will be appreciated that the length of the first washcoat zone 220 and the second washcoat zone 230 can be varied. In one or more embodiments, the first washcoat zone 220 and the second washcoat zone 230 can be equal in length. In other embodiments, the first washcoat zone 220 can be in the range of about 10 to 90%, or about 20 to about 80% of the length L2 of the substrate 210, with the second washcoat zone 230 respectively covering the remainder of the length L2 of the substrate 210, as depicted in FIG. 2A. In other embodiments, the first washcoat zone 220 can be about 10%, about 15%, about 20%, about 25%, about 30%, about 35%, about 40%, about 45%, about 50%, about 55%, about 60%, about 65%, about 70%, about 75%, about 80%, about 85%, or about 90% of the length L2 of the substrate 210, with the second washcoat zone 230 respectively covering the remainder of the length L2 of the substrate 210, with a gap 290, as depicted in FIG. 2B.

It will also be appreciated by one skilled in the art that the first washcoat zone and second washcoat zone can be at least partially overlapping (not illustrated). As used herein, the term "at least partially overlapping" means that the first washcoat zone and the second washcoat zone can overlap each other by an amount in the range of at least about 0.1% to at least about 99%. In one or more embodiments, the first washcoat zone and second washcoat zone can be completely overlapping. In one or more embodiments the first washcoat zone is partially overlapping the second washcoat zone. In other embodiments, the second washcoat zone is partially overlapping the first washcoat zone.

The Substrate

In one or more embodiments, the catalyst materials can be applied to a substrate as a washcoat. As used herein, the term "substrate" refers to the monolithic material onto which the catalyst is placed, typically in the form of a washcoat. A washcoat is formed by preparing a slurry containing a specified solids content (e.g., 30-90% by weight) of catalyst in a liquid vehicle, which is then coated onto a substrate and dried to provide a washcoat layer.

In one or more embodiments, the substrate is a ceramic or metal having a honeycomb structure. Any suitable substrate may be employed, such as a monolithic substrate of the type having fine, parallel gas flow passages extending there through from an inlet or an outlet face of the substrate such that passages are open to fluid flow there through. The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e. cells) per square inch of cross section.

The ceramic substrate may be made of any suitable refractory material, e.g. cordierite, cordierite-α-alumina, silicon nitride, zircon mullite, spodumene, alumina-silica-magnesia, zircon silicate, sillimanite, a magnesium silicate, zircon, petalite, α-alumina, an aluminosilicate and the like.

The substrates useful for the catalyst of embodiments of the present invention may also be metallic in nature and be composed of one or more metals or metal alloys. The metallic substrates may be employed in various shapes such as pellets, corrugated sheet or monolithic form. Specific examples of metallic substrates include the heat-resistant, base-metal alloys, especially those in which iron is a substantial or major component. Such alloys may contain one or more of nickel, chromium, and aluminum, and the total of these metals may advantageously comprise at least about 15 wt. % of the alloy, for instance, about 10 to 25 wt. % chromium, about 1 to 8 wt. % of aluminum, and about 0 to 20 wt. % of nickel.

In one or more embodiments, the catalyst for oxidizing ammonia may be coated on a high porosity ceramic honeycomb flow through support. The high porosity ceramic honeycomb flow through support can have the following properties: a large fraction of interconnected pores; the porosity of wall material is greater than about 50% and up to about 70% porosity; a mean pore size greater than 20 microns, for example, greater than 25 microns, more specifically greater than about 30 microns, and more particularly greater than about 40 microns but less than about 100 microns; and a broad pore size distribution.

In one or more embodiments, the catalyst for oxidizing ammonia of one or more embodiments may be coated on a wall-flow filter. As recognized by one skilled in the art, when a selective catalytic reduction article is coated on a wall-flow filter, the result is SCR on a Filter. In one or more embodiments, the catalyst comprising a washcoat including copper or iron on a molecular sieve material mixed with platinum and rhodium on a refractory metal oxide support may be coated on a wall-flow filter.

In other embodiments, the first washcoat zone including copper or iron on a molecular sieve material is coated on a wall-flow filter, such as to produce SCR on a Filter, and the second washcoat zone including copper or iron on a molecular sieve material mixed with platinum on a refractory metal oxide support is coated on a flow through monolith. In still further embodiments, both the first washcoat zone and the second washcoat zone are coated on a wall-flow filter. In such embodiments where both the first washcoat zone and the second washcoat zone are coated on a wall-flow filter, the first washcoat zone and the second washcoat zone can be coated on a single wall-flow filter, or the first washcoat zone and the second washcoat zone can be coated on separate wall-flow filters so that two bricks are present in the exhaust gas treatment system.

Figure 3A:
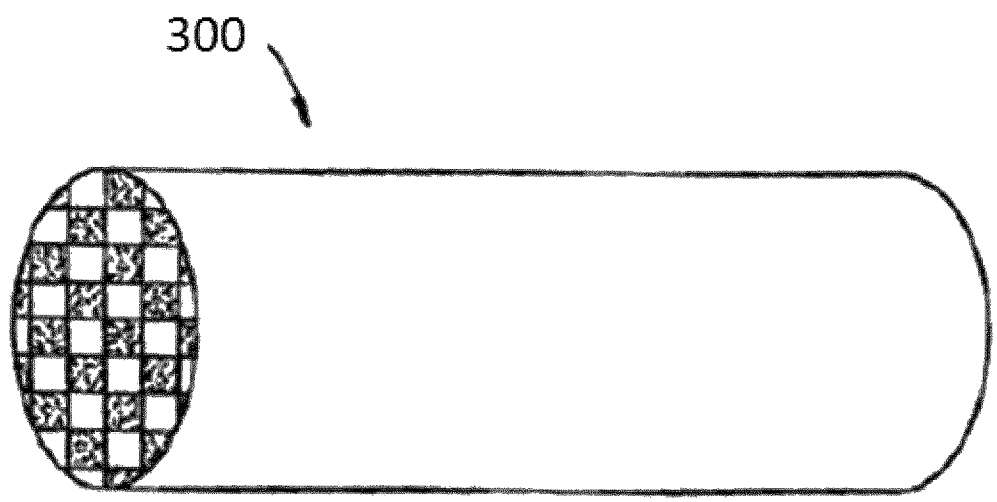
FIG. 3A shows a perspective view of a wall flow filter substrate.
Figure 3B:
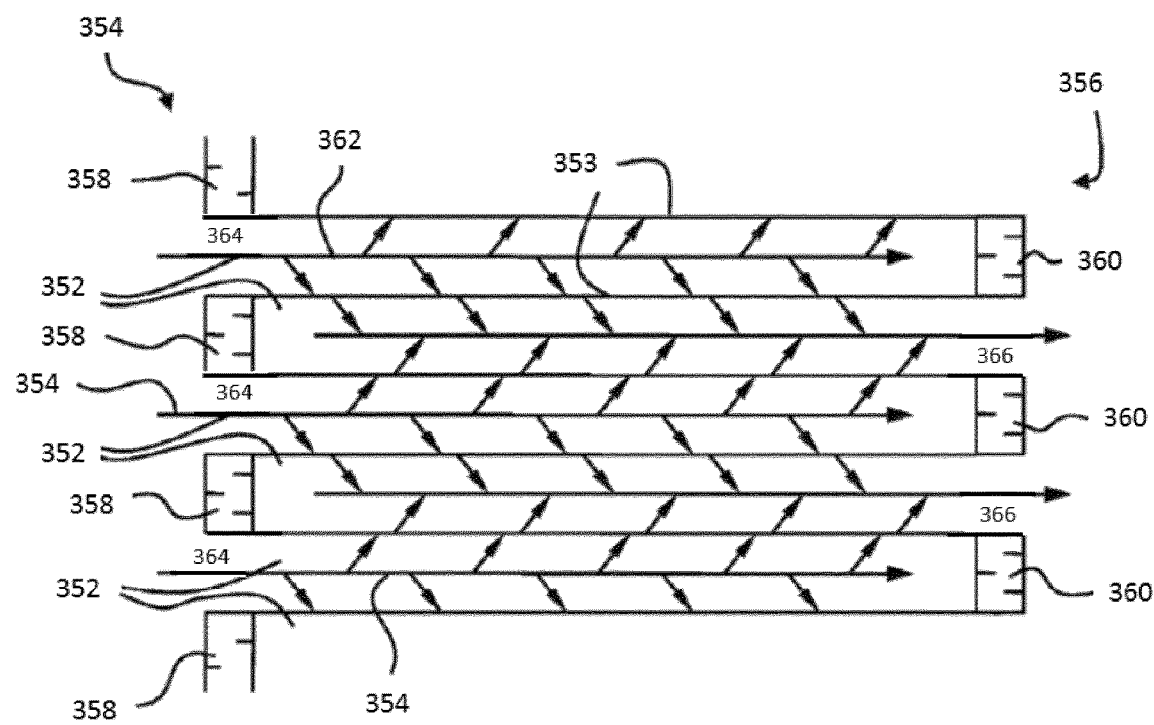
FIG. 3B shows a cross-sectional view of a second of a wall flow filter substrate.

FIGS. 3A and 3B illustrate a wall flow filter substrate 300 which has a plurality of passages 352. The passages are tubularly enclosed by the channel walls 353 of the filter substrate. The substrate has an inlet end 354 and an outlet end 356. Alternate passages are plugged at the inlet end with inlet plugs 358, and at the outlet end with outlet plugs 360 to form opposing checkerboard patterns at the inlet end 354 and outlet end 356. A gas stream 362 enters through the unplugged channel inlet 364, is stopped by outlet plug 360 and diffuses through channel walls 353 (which are porous) to the outlet side 366. The gas cannot pass back to the inlet side of walls because of inlet plugs 358.

In one or more embodiments, wall flow filter substrates are composed of ceramic-like materials such as cordierite, α-alumina, silicon carbide, silicon nitride, zirconia, mullite, spodumene, alumina-silica-magnesia or zirconium silicate, or of porous, refractory metal. In other embodiments, wall flow substrates are formed of ceramic fiber composite materials. In specific embodiments, wall flow substrates are formed from cordierite and silicon carbide. Such materials are able to withstand the environment, particularly high temperatures, encountered in treating the exhaust streams.

In one or more embodiments, wall flow substrates include thin porous walled honeycombs monoliths through which the fluid stream passes without causing too great an increase in back pressure or pressure across the article. Normally, the presence of a clean wall flow article will create a back pressure of 1 inch water column to 10 psig. Ceramic wall flow substrates used in the system are formed of a material having a porosity of at least 50% (e.g., from 50 to 75%) having a mean pore size of at least 5 microns (e.g., from 5 to 30 microns). In one or more embodiments, the substrates have a porosity of at least 55% and have a mean pore size of at least 10 microns. When substrates with these porosities and these mean pore sizes are coated with the techniques described below, adequate levels of catalyst compositions can be loaded onto the substrates to achieve excellent $NO_x$ conversion efficiency. These substrates are still able to retain adequate exhaust flow characteristics, i.e., acceptable back pressures, despite the SCR catalyst loading. U.S. Pat. No. 4,329,162 is herein incorporated by reference with respect to the disclosure of suitable wall flow substrates.

Typical wall flow filters in commercial use are formed with lower wall porosities, e.g., from about 35% to 50%, than the wall flow filters utilized in the invention. In general, the pore size distribution of commercial wall flow filters is typically very broad with a mean pore size smaller than 17 microns.

The porous wall flow filter used in one or more embodiments is catalyzed in that the wall of said element has thereon or contained therein one or more catalytic materials. Catalytic materials may be present on the inlet side of the element wall alone, the outlet side alone, both the inlet and outlet sides, or the wall itself may consist all, or in part, of the catalytic material. This invention includes the use of one or more layers of catalytic materials and combinations of one or more layers of catalytic materials on the inlet and/or outlet walls of the element.

To coat the wall flow substrates with the catalytic article of one or more embodiments, the substrates are immersed vertically in a portion of the catalyst slurry such that the top of the substrate is located just above the surface of the slurry. In this manner slurry contacts the inlet face of each honeycomb wall, but is prevented from contacting the outlet face of each wall. The sample is left in the slurry for about 30 seconds. The substrate is removed from the slurry, and excess slurry is removed from the wall flow substrate first by allowing it to drain from the channels, then by blowing with compressed air (against the direction of slurry penetration), and then by pulling a vacuum from the direction of slurry penetration. By using this technique, the catalyst slurry permeates the walls of the substrate, yet the pores are not occluded to the extent that undue back pressure will build up in the finished substrate. As used herein, the term "permeate" when used to describe the dispersion of the catalyst slurry on the substrate, means that the catalyst composition is dispersed throughout the wall of the substrate.

The coated substrates are dried typically at about 100° C. and calcined at a higher temperature (e.g., 300 to 450° C.). After calcining, the catalyst loading can be determined through calculation of the coated and uncoated weights of the substrate. As will be apparent to those of skill in the art, the catalyst loading can be modified by altering the solids content of the coating slurry. Alternatively, repeated immersions of the substrate in the coating slurry can be conducted, followed by removal of the excess slurry as described above.

Washcoat Layers

According to one or more embodiments, the $NH_3$ oxidation catalyst can be applied in washcoat layers, which are coated upon and adhered to the substrate. As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated.

For example, a washcoat layer of a composition containing an $NH_3$ oxidation catalyst may be formed by preparing a mixture or a solution of copper or iron on a molecular sieve material and a platinum precursor and/or a rhodium precursor in a suitable solvent, e.g. water. Generally, from the point of view of economics and environmental aspects, aqueous solutions of soluble compounds or complexes of the platinum and/or rhodium are preferred. Typically, the platinum and/or rhodium precursor is utilized in the form of a compound or complex to achieve dispersion of the platinum precursor and/or rhodium precursor on the support. For purposes of the present invention, the terms "platinum precursor," "rhodium precursor," "palladium precursor," etc. means any compound, complex, or the like which, upon calcination or initial phase of use thereof, decomposes or otherwise converts to a catalytically active form. Suitable platinum complexes or compounds include, but are not limited to platinum chlorides (e.g. salts of $[PtCl_4]^{2-}$, $[PtCl_6]^{2-}$), platinum hydroxides (e.g. salts of $[Pt(OH)_6]^{2-}$), platinum ammines (e.g. salts of $[Pt(NH_3)_4]^{2+}$, $Pt(NH_3)_4]^{2+}$), platinum hydrates (e.g. salts of $[Pt(OH_2)_4]^{2+}$), platinum bis(acetylacetonates), and mixed compounds or complexes (e.g. $[Pt(NH_3)_2(Cl)_2]$). However, it will be understood that this invention is not restricted to platinum precursors of a particular type, composition, or purity.

Suitable rhodium complexes or compounds include, but are not limited to rhodium chlorides, rhodium hydroxides, rhodium nitrates, and the like. In one or more embodiments a rhodium nitrate solution is used, which can be prepared by dissolution of $Rh_2O_3$ in nitreous acid and may be denoted as dissolved $Rh(NO_3)_3$.

However, it will be understood that this invention is not restricted to rhodium precursors of a particular type, composition, or purity. A mixture or solution of the platinum and/or rhodium precursor is added to the support by one of several chemical means. These include impregnation of a solution of the platinum precursor and/or rhodium precursor onto the support, which may be followed by a fixation step incorporating acidic component (e.g. acetic acid) or a basic component (e.g. ammonium hydroxide). This wet solid can be chemically reduced or calcined or be used as is. Alternatively, the support may be suspended in a suitable vehicle (e.g. water) and reacted with the platinum precursor and/or rhodium precursor in solution. Additional processing steps may include fixation by an acidic component (e.g. acetic acid) or a basic component (e.g. ammonium hydroxide), chemical reduction, or calcination.

In one or more embodiments utilizing washcoat layers of an SCR composition, the layer can contain a zeolitic or non-zeolitic molecular sieve on which has been distributed a metal selected from one or more of copper (Cu), iron (Fe), cobalt (Co), nickel (Ni), lanthanum (La), cerium (Ce), manganese (Mn), vanadium (V), or silver (Ag). An exemplary metal of this series is copper. Exemplary molecular sieves, include, but are not limited to zeolites having one of the following crystal structures CHA, AEI, AFX, ERI, KFI, LEV, AFT, EAB, DDR, PAU, RHO, SAV, SAT, TSC, UEI and combinations thereof. A suitable method for distributing the metal on the zeolite is to first prepare a mixture or a solution of the metal precursor in a suitable solvent, e.g. water. Generally, from the point of view of economics and environmental aspects, aqueous solutions of soluble compounds or complexes of the metal are preferred. For purposes of the present invention, the term "metal precursor" means any compound, complex, or the like which, can be dispersed on the zeolite support to give a catalytically-active metal component. For copper, suitable complexes or compounds include, but are not limited to anhydrous and hydrated copper sulfate, copper nitrate, copper acetate, copper acetylacetonate, copper oxide, copper hydroxide, and salts of copper ammines (e.g. $[Cu(NH_3)_4]^{2+}$). However, it will be understood that this invention is not restricted to metal precursors of a particular type, composition, or purity. The molecular sieve can be added to the solution of the metal component to form a suspension. This suspension can be allowed to react so that the copper component is distributed on the zeolite. This may result in copper being distributed in the pore channels as well as on the outer surface of the molecular sieve. Copper may be distributed as copper (II) ions, copper (I) ions, or as copper oxide. After the copper is distributed on the molecular sieve, the solids can be separated from the liquid phase of the suspension, washed, and dried. The resulting copper-containing molecular sieve may also be calcined to fix the copper.

To apply a washcoat layer according to one or more embodiments of the invention, finely divided particles of a catalyst, including the SCR component, the $NH_3$ oxidation catalyst, or a mixture thereof, are suspended in an appropriate vehicle, e.g., water, to form a slurry. Other promoters and/or stabilizers and/or surfactants may be added to the slurry as mixtures or solutions in water or a water-miscible vehicle. In one or more embodiments, the slurry is comminuted/milled to result in substantially all of the solids having particle sizes of less than about 10 microns, i.e., in the range of about 0.1-8 microns, in an average diameter. The comminution/milling may be accomplished in a ball mill, continuous Eiger mill, or other similar equipment. In one or more embodiments, the suspension or slurry has a pH of about 2 to less than about 7. The pH of the slurry may be adjusted if necessary by the addition of an adequate amount of an inorganic or an organic acid to the slurry. The solids content of the slurry may be, e.g., about 20-60 wt. %, and more particularly about 35-45 wt. %. The substrate may then be dipped into the slurry, or the slurry otherwise may be coated on the substrate, such that there will be deposited on the substrate a desired loading of the catalyst layer. Thereafter, the coated substrate is dried at about 100° C. and calcined by heating, e.g., at 300-650° C. for about 1 to about 3 hours. Drying and calcination are typically done in air. The coating, drying, and calcination processes may be repeated if necessary to achieve the final desired gravimetric amount of the catalyst washcoat layer on the support. In some cases, the complete removal of the liquid and other volatile components may not occur until the catalyst is placed into use and subjected to the high temperatures encountered during operation.

After calcining, the catalyst washcoat loading can determined through calculation of the difference in coated and uncoated weights of the substrate. As will be apparent to those of skill in the art, the catalyst loading can be modified by altering the solids content of the coating slurry and slurry viscosity. Alternatively, repeated immersions of the substrate in the coating slurry can be conducted, followed by removal of the excess slurry as described above.

Method for Treating Emissions

Another aspect of the present invention includes a method of treating emissions produced in the exhaust gas stream of a lean-burn engine. The exhaust gas stream can include one or more of $NO_x$, CO, hydrocarbons, and ammonia. In one or more embodiments, the method includes injecting ammonia or an ammonia precursor into an exhaust gas stream and then passing the exhaust gas stream through the catalyst of one or more embodiments.

Emission Treatment System

Another aspect of the present invention is directed to an emission treatment system comprising one or more additional components for the treatment of diesel exhaust gas emissions. Diesel engine exhaust is a heterogeneous mixture which contains not only gaseous emissions such as carbon monoxide, unburned hydrocarbons and $NO_x$, but also condensed phase materials (liquids and solids) which constitute the particulates or particulate matter. Often, catalyst compositions and substrates on which the compositions are disposed are provided in diesel engine exhaust systems to convert certain or all of these exhaust components to innocuous components. For example, diesel exhaust systems can contain one or more of a diesel oxidation catalyst and a soot filter, in addition to a catalyst for the reduction of $NO_x$. Embodiments of the present invention can be incorporated into diesel exhaust gas treatment systems. One such system is disclosed in U.S. Pat. No. 7,229,597, which is incorporated herein by reference in its entirety.

Figure 4:
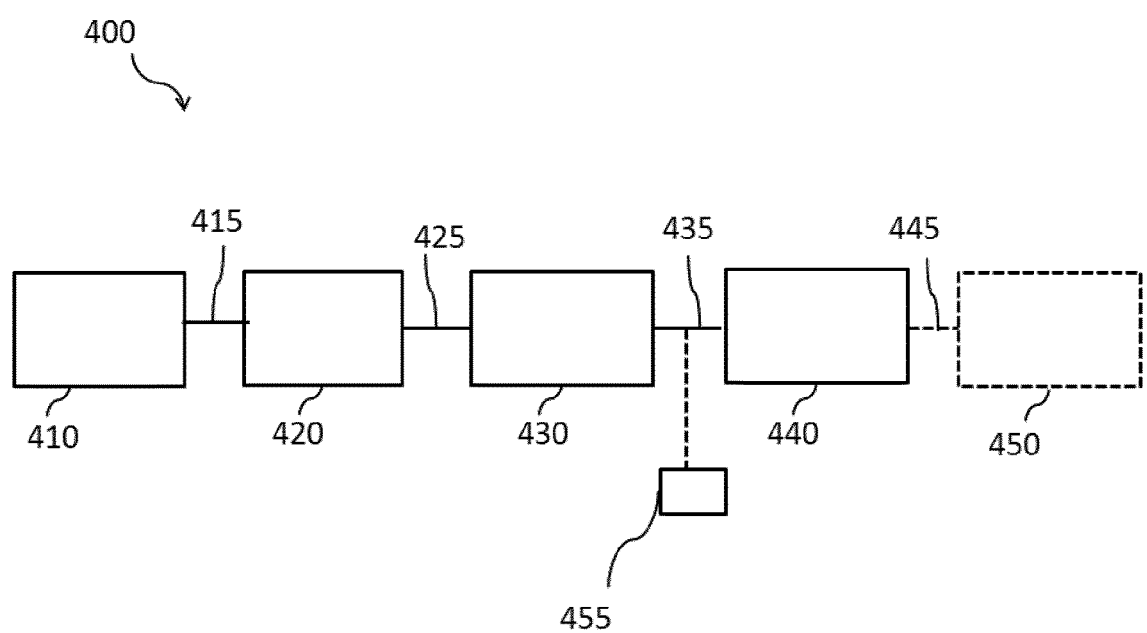
FIG. 4 is a schematic of an engine emission treatment system, in accordance with one or more embodiments.

An example of an emission treatment system may be more readily appreciated by reference to FIG. 4, which depicts a schematic representation of an emission treatment system 400, in accordance with one or more embodiments of the present invention. An exhaust gas stream containing gaseous pollutants (e.g., unburned hydrocarbons, carbon monoxide and $NO_x$) and particulate matter is conveyed via line 415 from an engine 410 to a diesel oxidation catalyst (DOC) 420. In the DOC, unburned gaseous and non-volatile hydrocarbons and carbon monoxide are largely combusted to form carbon dioxide and water. In addition, a proportion of the NO of the $NO_x$ component may be oxidized to $NO_2$ in the DOC. The exhaust stream is next conveyed via line 425 to a catalyzed soot filter (CSF) 430, which traps particulate matter present within the exhaust gas stream. The CSF is optionally catalyzed for passive regeneration. After removal of particulate matter, via CSF 430, the exhaust gas stream is conveyed via line 435 to a downstream catalyst 440. The downstream catalyst 440 may be the catalyst according to one or more embodiments described herein, for the treatment and/or conversion of $NO_x$ and ammonia.

In other embodiments, the downstream catalyst 440 may be a SCR catalyst. In embodiments where the downstream catalyst 440 is a SCR catalyst, the exhaust gas treatment system includes one or more of a urea storage tank, a urea pump, a urea dosing system, a urea injector/nozzle, and a respective control unit 455 upstream from the SCR catalyst 440 for injecting a source of ammonia into the exhaust gas stream. In such embodiments, the exhaust gas treatment system may also include an ammonia oxidation catalyst 450 downstream from the SCR catalyst 440 via line 445. The ammonia oxidation catalyst 450 may be a catalyst according to one or more embodiments described herein.

The invention is now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

EXAMPLES

Preparation of Catalysts

Example 1: No PGM

A zirconia acetate solution (1.3 kg) was mixed with deionized water (9 kg) in a container. Cu-SSZ-13 with 3 wt. % CuO (8.6 kg) was added to this mixture to form a dispersion, and the resulting dispersion was milled with a ball mill until a particle size measurement resulted in a particle size distribution of 90% of the particle smaller than 5 microns.

In a separate container, alumina powder (716 g) that was doped with 20 wt. % zirconia was added into deionized water (4.5 Kg) containing tartaric acid (13 mg) and monoethanolamine (5 mg). The pH of the mixture was adjusted to 4 with tartaric acid. Afterwards, the mixture was milled with a ball mill to obtain a particle size distribution of 90% of the particles smaller than 10 micron.

Example 2: Pt Only

A solution of zirconia acetate (1.3 Kg) was mixed with deionized water (9 Kg) in a container. To this mixture was added Cu-SSZ-13 with 3 wt. % CuO (8.6 Kg), and the resulting dispersion was milled with a ball mill until a particle size measurement resulted in a particle size distribution of 90% of the particles smaller than 5 microns.

In a separate container, a solution of platinum monoethanol (45 g) with 17 wt. % Pt was mixed with deionized water (100 mL). This mixture was added dropwise onto an alumina powder that was doped with 20 wt. % zirconia (716 g). The resulting powder was then calcined in a box oven for 2 h at 600° C. under air. The calcined powder was added into deionized water (4.5 kg) that contained tartaric acid (13 mg) and monoethanolamine (5 mg). The pH of the mixture was adjusted to 4 with tartaric acid. Afterwards, the mixture was milled with a ball mill to obtain a particle size distribution of 90% of the particle smaller than 10 micron.

The resulting slurry was coated onto a ceramic honeycomb substrate to obtain a loading of 3.25 $g/in^3$ after calcination for 2 h at 600° C. [The Amox with Pt, Pt/Rh on Zr doped alumina has 3.25 $g/inch^3$ loading]

Example 3: Zoned

A zone catalyst was prepared from the slurries from Example 1 and 2 in the following way:

The slurry from Example 1 was coated to 50% on the inlet part of a honeycomb, and the platinum containing slurry of Example 2 was coated on the remaining 50% of the rear zone of the honeycomb. In this way, the platinum was located only in 50% of the rear of the honeycomb.

Example 4: Pt/Rh

A solution of zirconia acetate (1.3 kg) was mixed with deionized water (9 kg) in a container. To this mixture was added Cu-SSZ-13 with 3 wt. % CuO (8.6 kg), and the resulting dispersion was milled with a ball mill until a particle size measurement resulted in a particle size distribution of 90% of the particles smaller than 5 microns.

In another container, a solution of platinum monoethanol (10 g) with 17 wt. % Pt was mixed with deionized water (100 mL). This mixture was added dropwise onto an Alumina powder (716 g) that was doped with 20 wt. % zirconia. Subsequently a solution of rhodium-nitrate (33 mL) with 10 wt. % of Rh was added dropwise onto the platinum alumina powder. The resulting powder was then calcined in a box oven for 2 h at 600° C. under air. The calcined powder was added into deionized water (4.5 kg) that contained tartaric acid (13 mg) and monoethanolamine (5 mg). The pH of the mixture was adjusted to 4 with tartaric acid. Afterwards, the mixture was milled with a ball mill to obtain a particle size distribution of 90% of the particle smaller than 10 micron.

Example 5: Rh

A solution of zirconia acetate (1.3 kg) was mixed with deionized water (9 kg) in a container. To this mixture was added Cu-SSZ-13 with 3 wt. % CuO (8.6 kg), and the resulting dispersion was milled with a ball mill until a particle size measurement resulted in a particle size distribution of 90% of the particle smaller than 5 microns.

In another container, a solution of rhodium-nitrate (85 g) with 9 wt. % Rh was mixed with deionized water (100 mL). This mixture was added dropwise onto an alumina powder (716 g) that was doped with 20 wt. % zirconia. The resulting powder was than calcined in a box oven for 2 h at 600° C. under air. The calcined powder was added into deionized water (4.5 kg) that contained tartaric acid (13 mg) and monoethanolamine (5 mg). The pH of the mixture was adjusted to 4 with tartaric acid. Afterwards, the mixture was milled with a ball mill to obtain a particle size distribution of 90% of the particle smaller than 10 micron.

The resulting slurry was coated onto a ceramic honeycomb substrate to obtain a loading of 3.25 $g/in^3$ after calcination for 2 h at 600° C.

Example 6: Pt/Pd

A solution of zirconia acetate (1.3 kg) was mixed with deionized water (9 kg) in a container. To this mixture was added Cu-SSZ-13 with 3 wt. % CuO (8.6 kg), and the resulting dispersion was milled with a ball mill until a particle size measurement resulted in a particle size distribution of 90% of the particles smaller than 5 microns.

In another container, a solution of platinum monoethanolamine (26 g) with 17 wt. % Pt was mixed with deionized water (100 mL). This mixture was added dropwise onto an alumina powder (716 g) that was doped with 20 wt. % zirconia. Subsequently a solution of palladium-nitrate (15 mL) with 20 wt. % of Pd was added dropwise onto the platinum alumina powder. The resulting powder was then calcined in a box oven for 2 h at 600° C. under air. The calcined powder was added into deionized water (4.5 kg) that contained tartaric acid (13 mg) and monoethanolamine (5 mg). The pH of the mixture was adjusted to 4 with tartaric acid.

Afterwards, the mixture was milled with a ball mill to obtain a particle size distribution of 90% of the particle smaller than 10 micron.

The resulting slurry was coated onto a ceramic honeycomb substrate to obtain a loading of 3.25 g/in$^3$ after calcination for 2 h at 600° C.

Example 7

First slurry: A solution of platinum monoethanol (330 g) with 17 wt. % Pt was mixed with deionized water (100 mL). This mixture was added dropwise onto an alumina powder (716 g) that was doped with 1.5 wt. % silica. To this powder was added water (800 mL) and glacial acetic acid (450 g). Subsequently, this powder was put into deionized water (4.5 kg) and milled at pH 4 with a ball mill to obtain a particle size distribution of 90% of the particle smaller than 7.5 micron.

The resulting slurry was coated onto a ceramic honeycomb substrate to obtain a covering of 40% of the rear zone of the honeycomb. The loading of the coating was 0.2 g/in$^3$ after calcination for 2 h at 600° C.

Second slurry: A solution of zirconia acetate (1.3 kg) was mixed with deionized water (9 kg) in a container. To this mixture was added Cu-SSZ-13 with 3 wt. % CuO (8.6 kg), and the resulting dispersion was milled with a ball mill until a particle size measurement resulted in a particle size distribution of 90% of the particle smaller than 5 microns.

The resulting slurry was coated onto a ceramic honeycomb substrate to obtain a loading of 2.85 g/in$^3$ after calcination for 2 h at 600° C.

Example 8: No PGM

A zirconia acetate solution (1.3 kg) was mixed with deionized water (9 kg) in a container. Cu-SSZ-13 with 3 wt. % CuO (8.6 kg) was added to this mixture to form a dispersion, and the resulting dispersion was milled with a ball mill until a particle size measurement resulted in a particle size distribution of 90% of the particle smaller than 5 microns.

The resulting slurry was coated onto a ceramic honeycomb substrate to obtain a loading of 3 g/in$^3$ after calcination for 2 h at 600° C.

Table 1 summarizes the formulations of the catalysts

TABLE 1

| Ex. # | Pt (g/ft$^3$) | Rh (g/ft$^3$) | Pd (g/ft$^3$) | Cu-CHA (g/L) | Zirconium Acetate (g/L) | PGM Support | Feature |
|---|---|---|---|---|---|---|---|
| 1 | — | — | — | 2.85 | 9 | alumina doped with 20% zirconia | No PGM |
| 2 | 5 | — | — | 2.85 | 9 | alumina doped with 20% zirconia | PGM/support is mixed into zeolite coating |
| 3 | 2.5 | — | — | 2.85 | 9 | alumina doped with 20% zirconia | PGM/support covers 50% in the outlet of the monolith |
| 4 | 3 | 2 | — | 2.85 | 9 | alumina doped with 20% zirconia | PGM/support is mixed into zeolite coating |
| 5 | — | — | — | 2.85 | 9 | alumina doped with 20% zirconia | PGM/support is mixed into zeolite coating |
| 6 | 3 | — | 2 | 2.85 | 9 | alumina doped with 20% zirconia | PGM/support is mixed into zeolite coating |
| 7 | 1.75 | — | — | 2.85 | 9 | alumina doped w/5% silica | PGM/alumina covers 40% in the outlet of the monolith |
| 8 | — | — | — | 2.85 | 9 | No alumina | No PGM |

Example 9: Testing

The SCR activity was tested under steady state engine operation conditions after aging for 16 h under hydrothermal conditions (10% $H_2O$ with 10% 02 and 80% $N_2$). For this test the engine was tuned to achieve a desired exhaust gas temperature at $NO_x$ emission of 250-300 ppm. If a constant temperature was achieved, urea was injected after the DOC/filter canning. The urea amount was adjusted to achieve a $NH_3$ to $NO_x$ ratio of 1.2 and was maintained for 10 min after 20 ppm $NH_3$ was measured after the catalyst. After stopping the urea dosing, the measurement was prolonged until the $NO_x$ conversion was decrease to less than 5% conversion.

Table 2 shows the arrangements of the catalyst for the stationary engine bench evaluation.

TABLE 2

| Catalyst | PGM (g/ft³) | Volume (L) | Dimensions (inch) cells/wall thickness (mil) |
|---|---|---|---|
| 1 DOC | 120 Pt:Pd = 1:1 | 1.24 | 5.66 * 3 400/6 |
| 2 CSF | 43 Pt:Pd = 3:1 | 2.44 | SiC, 5.66 * 6 300/12 |
| 3 SCR(AMOx) | 0 | 1.54 | 5.66 * 4.5 400/4 |

Table 3 shows the engine operation points and the exhaust gas conditions for the stationary bench evaluation.

TABLE 3

Engine Operation Conditions At SCR Test, Standard

| Inlet Gas Temp. (° C.) | Inlet $NO_x$ Conc. (ppm) | Inlet CO Conc. (ppm) | Inlet HC Conc. (ppm) | Alpha | VL (m³/h) | Urea Flow (mg/s) |
|---|---|---|---|---|---|---|
| 200 | 241 | 2 | 17 | 2 | 92 | 49 |
| 230 | 217 | 2 | 11 | 1.1 | 94 | 27 |
| 360 | 264 | 3 | 2 | 1.1 | 177 | 58 |
| 650 | 351 | 121 | 228 | 1.5 | 220 | 135 |

Example 10: Results

Table 4 shows the rest results of the stationary engine bench evaluation.

TABLE 4

| Ex. # | Temp. Out (° C.) | $NO_x$ Conv. (%) | $N_2O$ Emissions at 20 ppm $NH_3$ slip (ppm) | $NH_3$/$NO_x$ Ratio | $NH_3$ Emissions at Full $NO_x$ Conv. (ppm) |
|---|---|---|---|---|---|
| 1 (no PGM) | 223 | 85 | 5.9 | 1.9 | 250.0 |
| | 366 | 92 | 1.7 | 1.1 | 45.0 |
| | 652 | 64 | 0.4 | 1.6 | 150.0 |
| 3 (Pt) | 224 | 84 | 10.4 | 2.0 | 220.0 |
| | 374 | 48 | 23.5 | 1.2 | 7.0 |
| | 649 | −62 | 2.3 | 1.6 | 25.0 |
| 4 (Pt/Rh) | 221 | 84 | 6.4 | 1.9 | 200.0 |
| | 374 | 64 | 10.9 | 1.1 | 9.0 |
| | 655 | −19 | 0.8 | 1.6 | 30.0 |
| 5 (Rh) | 221 | 83 | 5.7 | 1.9 | 210.0 |
| | 370 | 87 | 1.5 | 1.1 | 45.0 |
| | 649 | 61 | 0.6 | 1.6 | 200.0 |
| 7 (Pt with $SiO_2$ doped alumina) | 207 | 71 | 8.4 | 2.0 | 170.0 |
| | 372 | 63 | 12.1 | 1.2 | 8.0 |
| | 653 | 3 | 1.7 | 1.6 | 35.0 |

All samples had comparable $NO_x$ conversion at 220° C. The $NO_x$ conversion at 370° C. and 650° C., however, was lower for the Pt containing samples (Examples 3, 4, and 7). Example 5 that contains Rh only had the same $NO_x$ conversion as Example 1, and, therefore, Rh behaved inert to the selective $NO_x$ reduction. The Pt only sample (Example 3) had the lowest $NO_x$ conversion at higher temperature and higher $N_2O$ formation. Negative $NO_x$ conversions at 650° C. mean that $NH_3$ feed converted to undesired $NO_x$ at a high rate. The low $NH_3$ emissions at full load obtained for the Pt/Rh sample (Example 4) indicated that this technology had a high $NH_3$ oxidation rate at low $N_2O$ formation.

The Pt and Rh containing sample (Example 4), however, had lower $N_2O$ formation compared to the zoned Example 7 sample and the same $NO_x$ conversion at 370° C. The result shows that the addition of Rh to Pt lowers the $N_2O$ formation and a high $NH_3$ oxidation rate is maintained.

Example 11: Testing

The Artemis test was performed with a 2 L EU 6 engine with a system consisting of a DOC, SCR on a filter close coupled to the engine, and an AMOx-SCR catalyst in a position 1.5 meter downstream of the engine. All AMOx catalysts were hydrothermally aged (10% $H_2O$ with 10% 02 and 80% $N_2$) for 16 h at 750° C. in an oven prior to the measurement.

Table 6 shows the catalyst arrangement for the Artemis test at the engine bench.

TABLE 6

| Catalyst | PGM (g/ft³) | Volume/L | Dimensions, inch, cells/wall thickness (mil) |
|---|---|---|---|
| 1 DOC | 120 (Pt:Pd = 4:1) | 1.42 | 5.66 * 3, 400/6 |
| 2 SCRoF | 0 | 3.1 | SiC, 6.5 * 5.5 300/12 |
| 3 SCR(AMOx) | 0 | 1.54 | 5.66 * 4.5 400/4 |

The urea was dosed into the exhausted system after the DOC to achieve a $NH_3$ to $NO_x$ ratio of 1.06.

Table 7 shows the emission results with the different AMOx catalysts used in the system.

TABLE 7

| AMOx Catalyst | $NO_x$ Engine Out (g/Km) | $NO_x$ (g/Km) | $NH_3$ (g/Km) | $N_2O$ (g/Km) | Average Inlet Temp. (° C.) |
|---|---|---|---|---|---|
| Ex. 1 | 0.313 | 0.087 | 0.027 | 0.010 | 180 |
| Ex. 4 | 0.314 | 0.103 | 0.000 | 0.013 | 180 |
| Ex. 5 | 0.314 | 0.119 | 0.000 | 0.014 | 180 |
| Ex. 7 | 0.305 | 0.105 | 0.000 | 0.015 | 180 |

The best emission results were obtained with Example 1 without PGM. In this case, however, ammonia emissions are difficult to avoid. All Pt containing samples completely avoided $NH_3$ emissions, and the sample with the lowest $N_2O$ and lowest $NO_x$ emissions among these samples was the Pt/Rh containing sample (Example 4). Example 7 resulted in higher $N_2O$ emissions. To further assess the potential of the Pt/Rh sample (Example 4), laboratory tests were conducted that simulated the dynamic Artemis test protocol with an NO only feed to simulate the conditions in an exhaust manifold after a soot filter with Cu-zeolite coating (SCR on a filter) in the underbody positions of a 2 L VW EU 6 Engine. In this test, ammonia was dosed dynamically to obtain a $NH_3$ to $NO_x$ ratio of 1.2.

TABLE 8

Laboratory Reactor Artemis Test, Feed Gas: NO Only

| Ex. # | $NO_x$ Inlet (g/(L)) | $NO_x$ Outlet (g/(L)) | $NH_3$ Outlet (g/(L)) | $N_2O$ Outlet (g/(L)) | $NO_x$ Conv. (%) | $NH_3$ Conv. (%) |
|---|---|---|---|---|---|---|
| 1 | 7.65 | 1.81 | 3.04 | 0.590 | 76 | 81 |
| 2 | 7.65 | 1.85 | 3.04 | 0.644 | 76 | 79 |
| 4 | 7.67 | 3.06 | 3.06 | 0.018 | 60 | 99 |
| 5 | 7.57 | 2.56 | 3.06 | 0.030 | 66 | 99 |

The results in Table 8 show that all PGM containing samples remove $NH_3$ entirely, but on the expense of overall $NO_x$ conversion. The best $NO_x$ conversions are achieved without PGM (Example 1). The lowest $N_2O$ emissions without $NH_3$ emissions, however, were achieved with the Pt/Rh sample (Example 4).

A very effective ammonia oxidation catalyst was prepared by mixing Pt/Rh supported on a doped gamma alumina material with a Cu-CHA zeolite for selective catalytic reduction of $NO_x$ with ammonia. The mixing was performed in a way that the Pt/Rh/doped alumina was spatially separated from the zeolite material.

Furthermore, the Pt and Rh did not migrate to the zeolite particles and remained located on the doped alumina particles. The Cu migrated to the doped alumina particles in a way that there was the same or slightly higher Cu concentration found on the doped alumina particles as found on the zeolite particles. The Rh formed an alloy with the Pt and thus lowered the reaction rate for $NO_2$ and $N_2O$ formation strongly. This design allowed the application of a higher Pt concentration compared to Example 7 (according to WO2010/012730), and, thus, enabled implementation of a higher ammonia oxidation rate.

Without intending to be bound by theory, it is thought that the homogeneous design (Example 4) has an advantage over the layered design of Example 7 because nitrogen oxides formed on Pt can react with ammonia absorbed in the close vicinity of the doped alumina particles to form the desired $N_2$. In this way a high selectivity for $N_2$ formation can be achieved, even at very high ammonia or urea dosing rates.

Example 12: Testing

The Artemis test was performed with a 2 L EU 6 engine with a system consisting of a DOC, SCR on a filter close coupled to the engine, and an AMOx-SCR catalyst in a position 1.5 meter downstream of the engine. All AMOx catalysts were hydrothermally aged (10% $H_2O$ with 10% O2 and 80% $N_2$) for 16 h at 750° C. in an oven prior to the measurement.

Test Conditions:

The maximum $NO_x$ engine out concentration was 1500 ppm, the average $NO_x$ concentration was 145 ppm. The maximum AMOx inlet (SCR on a filter out) concentration was 1100 ppm, the average $NO_x$ concentration was 50 ppm. The maximum AMOx space velocity was 150,000 $h^{-1}$, the average space velocity was 32 000 $h^{-1}$. The maximum AMOx inlet temperature was 420° C., and the average temperature was 192° C.

Table 9 below shows the $NO_x$ emissions in g/Km before the DOC and after the DOC plus SCR on a filter system.

Furthermore, the quantity of $NO_x$ reduced over the underfloor AMOx catalyst is given in g/Km, as well as the $N_2O$ and $NH_3$ emissions downstream of the AMOx catalyst. The highest value for the quantity of $NO_x$ removed over the AMOx indicates the best results.

TABLE 9

| AMOx Catalyst | $NO_x$ Engine Out (g/Km) | $NO_x$ SCR on Filter Out (g/Km) | $NO_x$ Removed Over AMOx (g/Km) | $N_2O$ System Emissions (g/Km) | $NH_3$ System Emissions (g/Km) |
|---|---|---|---|---|---|
| Ex. 1 | 0.39 | 0.13 | 0.0332 | 0.016 | 0.0197 |
| Ex. 2 | 0.50 | 0.18 | −0.0082 | 0.023 | 0.0004 |
| Ex. 3 | 0.39 | 0.12 | 0.0129 | 0.020 | 0.0005 |
| Ex. 4 | 0.38 | 0.12 | 0.0074 | 0.019 | 0.0002 |
| Ex. 5 | | | | | |
| Ex. 6 | 0.38 | 0.12 | 0.0076 | 0.023 | 0.0036 |
| Ex. 7 | 0.38 | 0.12 | −0.0066 | 0.029 | 0.0006 |

The Example 1 catalyst without PGM provides the best $NO_x$ reduction and lowest $N_2O$ emissions, but does not remove the undesired $NH_3$ emissions. The state of the art AMOx catalyst (Example 2) with a bottom coat of Pt on silica doped alumina in the rear zone, removes the ammonia emissions effectively, but also leads to a negative value for removed $NO_x$ and results in high $N_2O$ emissions because the $NH_3$ is oxidized to $NO_x$ and $N_2O$ instead of $N_2$.

This result compares to an AMOx catalyst with 5 g/ft³ homogeneously mixed in the Cu-CHA coat according to the invention (Example 2). In this case, the $NO_x$ removal over the AMOx catalyst is negative again, but the $N_2O$ emissions are lower. The situation improves if this Pt containing catalyst is coated in 50% of the rear zone only (Example 3).

Furthermore, Pt in the homogeneous AMOx design can be alloyed with Pd or Rh. Example 5 shows the result with Pd and Example 6 with Rh. The catalyst with Rh (Example 4) achieves lower $N_2O$ and $NH_3$ emissions and it is, therefore, beneficial to use Rh. In particular, if one compares the $NO_x$ and $N_2O$ emissions with Examples 2, 6, and 4, the advantage of using Rh becomes evident, since the Rh containing catalyst achieves the lowest $NH_3$ and $N_2O$ emissions at a high $NO_x$ conversion efficiency.

Example 13: Testing

An additional evaluation of the different examples was carried out at a laboratory reactor with sample of 1 inch diameter and 4 inch length.

Test conditions laboratory test: The exhaust conditions were simulating the Artemis test protocol of a EU 6 engine with the temperatures in the underfloor condition (start temperature=20° C., max temperature=360° C., average temperature=220° C.). The maximum space velocity was 180,000 $h^{-1}$, the average space velocity was 54,000 $h^{-1}$. The maximum $NO_x$ emissions were 580 ppm, the average $NO_x$ emissions were 80 ppm. The cores were aged for 16 h at 750° C. with 10% steam in air. The evaluation was done without preconditioning with a typical $H_2O$ and $CO_2$ concentration, but without hydrocarbon and carbon monoxide present in the feed gas.

Table 11 below shows the NO$_x$ emissions in g/Km.

TABLE 11

| AMOx Catalyst | NO$_x$ Inlet (g/(L * Km)) | NO$_x$ Outlet (g/(L * Km)) | NH$_3$ Feed (g/(L * Km)) | NH$_3$ Outlet (g/(L * Km)) | N$_2$O Outlet (g/(L * Km)) |
|---|---|---|---|---|---|
| Ex. 1 | 0.692 | 0.165 | 0.276 | 0.054 | 0.011 |
| Ex. 2 | 0.697 | 0.278 | 0.278 | 0.002 | 0.098 |
| Ex. 4 | 0.689 | 0.232 | 0.277 | 0.003 | 0.052 |
| Ex. 5 | 0.696 | 0.167 | 0.276 | 0.059 | 0.011 |
| Ex. 6 | 0.688 | 0.212 | 0.277 | 0.083 | 0.015 |

The results in Table 11 show that the catalysts with Pt (Example 2) and Pt/Rh (Example 4) removed over 95% of the NH$_3$ emissions, while the catalysts having Rh (Example 5), Pt/Pd (Example 6), and no PGM (Example 1) resulted in high ammonia emissions. This indicated that the light off for ammonia oxidation was not reached at the laboratory test condition. The sample with Pt/Rh (Example 4) was the best compromise to achieving high NO$_x$ conversion at low N$_2$O and NH$_3$ emissions.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

The invention claimed is:

1. A catalyst for selectively oxidizing ammonia to dinitrogen and having minimal nitrogen oxide byproducts, the catalyst comprising a washcoat comprising:
    (i) copper on a small pore molecular sieve material having a maximum ring size of eight tetrahedral atoms; and
    (ii) platinum (Pt) and rhodium (Rh) on a refractory metal oxide support comprising alumina, silica, zirconia, titania, or a physical mixture or chemical combination or atomically doped combination thereof,
    wherein (i) and (ii) are physically mixed with each other, and
    a ratio of Pt to Rh in the catalyst is greater than 1,
    wherein the refractory metal oxide support is doped with at least one dopant chosen from Ce, La, Ba, Zr, Hf, Ta, Mn, Si, Ti, W, Mo, and Re, and
    wherein the dopant is present in an amount ranging from 5 weight % to 30 weight % based on the total weight of the refractory metal oxide support,
    wherein platinum is present in an amount in a range from 0.3 g/ft$^3$ to 20 g/ft$^3$ and rhodium is present in an amount in a range from 0.3 g/ft$^3$ to 20 g/ft$^3$, and
    there is no other platinum group metal present.

2. The catalyst of claim 1, wherein the washcoat is disposed on a monolithic substrate.

3. The catalyst of claim 2, wherein the monolithic substrate is a flow-through honeycomb substrate comprising a plurality of fine, substantially parallel gas flow passages extending along a longitudinal axis of the substrate.

4. The catalyst of claim 1, wherein (i) and (ii) are homogenously mixed in the washcoat.

5. The catalyst of claim 1, wherein the washcoat is substantially free of copper aluminate.

6. The catalyst of claim 1, wherein the molecular sieve material is at least one framework type chosen from CHA, AEI, AFX, ERI, KFI, LEV, AFT, EAB, DDR, PAU, RHO, SAV, SAT, TSC, and UEI.

7. The catalyst of claim 1, wherein the molecular sieve material is a CHA framework type.

8. The catalyst of claim 1, wherein the molecular sieve material has a silica to alumina ratio in a range of 2 to 200.

9. The catalyst of claim 1, wherein the washcoat comprises iron on a small pore molecular sieve material having a maximum ring size of eight tetrahedral atoms.

10. The catalyst of claim 1, wherein the catalyst is effective to eliminate more than 50% of NO$_x$ and slips less than about 20% of NH$_3$ after thermal simulated aging of the catalyst at 750° C. for 16 hours with 10% steam in air.

11. The catalyst of claim 1, wherein the ratio of Pt to Rh in the catalyst is greater than about 1.5.

12. The catalyst of claim 1, wherein the ratio of Pt to Rh in the catalyst is greater than 1 and less than or equal to 3.

13. The catalyst of claim 1, wherein the ratio of Pt to Rh in the catalyst is greater than 1.5 and less than or equal to 3.

14. The catalyst of claim 1, wherein the refractory metal oxide support has a particle size distribution of 90% of the particles smaller than 10 microns.

15. The catalyst of claim 1, wherein the catalyst is calcined and the rhodium and platinum are present as an alloy.

16. A catalyst for oxidizing ammonia, the catalyst comprising:
    a first washcoat zone comprising copper or iron on a small pore molecular sieve material having a maximum ring size of eight tetrahedral atoms, the first washcoat zone being substantially free of platinum group metal; and
    a second washcoat zone comprising the catalyst of claim 1.

17. The catalyst of claim 16, wherein the first washcoat zone and second washcoat zone are disposed on a monolithic substrate.

18. The catalyst of claim 17, wherein
    the first washcoat zone and the second washcoat zone are disposed adjacent on the monolithic substrate, and
    the first washcoat zone is upstream from the second washcoat zone.

19. The catalyst of claim 16, wherein the second washcoat zone comprises no other platinum group metal.

20. The catalyst of claim 16, wherein the molecular sieve material is at least one framework type chosen from CHA, AEI, AFX, ERI, KFI, LEV, AFT, EAB, DDR, PAU, RHO, SAV, SAT, TSC, and UEI.

21. The catalyst of claim 16, wherein the molecular sieve material is a CHA framework type.

22. The catalyst of claim 16, wherein the molecular sieve material has a silica to alumina ratio in a range of 2 to 200.

23. A method for treating emissions produced in an exhaust gas stream of a lean-burn engine, the method comprising:
  injecting ammonia or an ammonia precursor into an exhaust gas stream comprising one or more of $NO_x$, CO, or a hydrocarbon; and
  passing the exhaust gas stream through the catalyst of claim 1.

24. A system for treating emissions produced in an exhaust gas stream of a lean-burn engine, the system comprising:
  a source of ammonia and an injector to inject the source of ammonia into the exhaust gas stream;
  a selective catalytic reduction catalyst downstream from the source of ammonia to promote reaction of ammonia with at least one nitrogen oxide to form nitrogen and $H_2O$ selectively; and
  the catalyst according to claim 1.

25. The system of claim 24, further comprising an ammonia oxidation (AMOx) catalyst.

\* \* \* \* \*

UNITED STATES PATENT AND TRADEMARK OFFICE
CERTIFICATE OF CORRECTION

PATENT NO. : 11,213,789 B2  
APPLICATION NO. : 15/757384  
DATED : January 4, 2022  
INVENTOR(S) : Marcus Hilgendorff et al.

Page 1 of 1

It is certified that error appears in the above-identified patent and that said Letters Patent is hereby corrected as shown below:

On the Title Page

Item (30), in the Foreign Application Priority Data, "15183947" should read --15183947.9--.

Signed and Sealed this  
Eighth Day of March, 2022

Drew Hirshfeld  
*Performing the Functions and Duties of the*  
*Under Secretary of Commerce for Intellectual Property and*  
*Director of the United States Patent and Trademark Office*